(12) United States Patent
Mills

(10) Patent No.: US 8,849,594 B2
(45) Date of Patent: Sep. 30, 2014

(54) METHODS FOR MEASURING LEAKAGE RATE AND INFERRING PRODUCTION RATE OF AN OILFIELD DOWNHOLE PUMP

(75) Inventor: Thomas M. Mills, Katy, TX (US)

(73) Assignee: Lufkin Industries, Inc., Lufkin, TX (US)

( * ) Notice: Subject to any disclaimer, the term of this patent is extended or adjusted under 35 U.S.C. 154(b) by 671 days.

(21) Appl. No.: 13/187,330

(22) Filed: Jul. 20, 2011

(65) Prior Publication Data
US 2013/0024138 A1 Jan. 24, 2013

(51) Int. Cl.
*E21B 47/10* (2012.01)
*G01F 3/14* (2006.01)
*G06F 19/00* (2011.01)
*G06F 17/40* (2006.01)
*E21B 47/00* (2012.01)

(52) U.S. Cl.
CPC ............ *E21B 47/0008* (2013.01); *E21B 47/10* (2013.01); *G06F 19/00* (2013.01); *G06F 17/40* (2013.01); *G01F 3/14* (2013.01)
USPC ...... 702/51; 73/40; 702/1; 702/127; 702/187; 702/189

(58) Field of Classification Search
CPC . E21B 47/00; E21B 47/0007; E21B 47/0008; E21B 47/10; E21B 47/1025; E21B 49/00; E21B 2049/00; G01D 7/00; G01D 9/00; G01D 21/00; G01F 3/00; G01F 3/02; G01F 3/04; G01F 3/14; G01L 7/00; G01L 7/16; G06F 11/00; G06F 11/30; G06F 11/32; G06F 11/34; G06F 17/00; G06F 17/40; G06F 19/00; G06F 15/00; G06F 15/16; G06F 17/10

USPC ....... 73/37, 40, 40.5 R, 49.1, 152.01, 152.18, 73/152.27, 152.28, 152.54, 152.61, 432.1, 73/865.8, 865.9, 866.3; 137/551; 166/244.1, 50.01, 250.08, 335, 336, 166/337; 702/1, 2, 6, 33, 41, 42, 45, 47, 50, 702/51, 127, 138, 140, 187, 189; 708/100, 708/105, 200
See application file for complete search history.

(56) References Cited

U.S. PATENT DOCUMENTS 2,540,049 A * 1/1951 Hinson ................. 250/260
2,964,941 A * 12/1960 Chamberlain et al. ..... 73/152.61
5,252,031 A * 10/1993 Gibbs ..................... 417/53
2006/0149476 A1 * 7/2006 Gibbs et al. ................ 702/6

OTHER PUBLICATIONS

Nolen, Kenneth B. and Gibbs, Sam. G.; "Quantitative Determination of Rod-Pump Leakage with Dynamometer Techniques"; SPE Production Engineering; Aug. 1990, paper No. 18185.
Chambliss, Richard Kyle, "Plunger Leakage and Viscous Drag for Beam Pump Systems"; Masters Thesis; Texas Tech University; Aug. 2001.

* cited by examiner

*Primary Examiner* — Edward Cosimano
(74) *Attorney, Agent, or Firm* — Sutton McAughan Deaver, PLLC

(57) ABSTRACT

Methods for measuring the leakage rate of a downhole pump using either measured axial load information from the drive rod string or using measured production data. The invention is for methods of applying the leakage rate to a downhole dynamometer card, for a reciprocating rod pump, for determining well production.

16 Claims, 14 Drawing Sheets

METHODS FOR MEASURING LEAKAGE RATE AND INFERRING PRODUCTION RATE OF AN OILFIELD DOWNHOLE PUMP

BACKGROUND OF THE INVENTION

1. Field of the Invention

This invention is related generally to oilfield equipment for monitoring and controlling wells that are produced by rod pumping where subsurface fluid pumps are driven via a rod string which is reciprocated by a pumping unit located at the surface.

In particular, the invention concerns methods for measuring the leakage rate of the downhole pump using either measured axial load information from the drive rod string or using measured production data. The invention also concerns methods for applying that leakage rate to a downhole dynamometer card (for reciprocating rod pumps) for determining well production.

2. Description of the Prior Art

Traditional Production Testing

Knowledge of fluid production from individual wells is crucial to commercial oil and gas production. At a minimum, such knowledge facilitates accurate royalty payment, proper regulatory reporting, and improved operational decisions.

However, oil wells typically produce mixtures of oil, water, and gas. Designing and maintaining facilities to separate and measure these mixtures for each well is typically cost-prohibitive. One commonly employed alternative is to utilize "satellite" facilities with a dedicated test fixture. The production from a collection of wells is routed to a single separation and storage facility. The aggregate production from these wells is metered on a daily basis through "sales" meters. The facility is also equipped with a separate metering ("test") system. The production from a single well is routed through this test facility for a period of time thereby allowing a "spot" measurement of the well's production. Production from each well is regularly rotated through the "test" metering system over a given period of time. At the end of a pre-determined period (often, monthly) an accounting procedure is used to allocate the aggregate production to individual wells. The allocation is performed using the "spot"/"test" measurements as a means of determining each well's individual share of the total production.

The production test method described above is far from ideal. The test metering systems are expensive to construct and to maintain. Various practical operational factors can cause the individual well "tests" to be inaccurate. Furthermore, the method does not account for transient events which occur throughout the aggregate metering period (e.g. a month) at individual wells.

Even with such traditional production testing, it may not be feasible to meet regulatory requirements. In some municipalities, the regulatory agency specifies a test frequency and a test duration such that there is insufficient time to rotate all wells from a particular "satellite" through the "test" fixture in the prescribed time.

Pump Metering

In an effort to deliver a near-continuous individual well production measurement, various efforts have been made to use the downhole pump as a meter. The initial premise of these efforts is that reciprocating rod pumps (RRP's) are generally classified as "positive displacement" pumps. For a specific amount of reciprocating travel (or "stroke"), a particular RRP should pump a specific volume of fluid. The "positive displacement meter" concept, though, is not purely applicable to oilfield downhole pumps.

U.S. Pat. No. 7,212,923 (assigned to the assignee of this application) describes a prior method of estimating production of a well from analysis of a pump card. Such patent is incorporated herein by reference as if it were exactly reproduced herein. The patent describes a well manager algorithm to be performed to obtain an estimate of liquid production passing through the pump in an interval of time. The well manager derives the liquid stroke $S_l$ from the pump card and computes the liquid volume raised during the stroke with information as to the volume capacity of the cylinder of the pump. The well manager accumulates the liquid volumes during pumping strokes, whatever the fillage. The well manager has information as to when the pumping unit is stopped and no fluid is passing through the pump. The well manager controls when the unit runs and when it is stopped.

When 24 hours have passed, the well manager computes the inferred daily production rate, RIP, in barrels per day from the elapsed time and accumulated volumes. The inferred production, based on the geometry of the pump and the daily percentage of time the pump is in operation is understood to not reflect actual conditions of pump leakage, unanchored tubing, free gas volume in pump at time of traveling valve (TV) opening, and oil shrinkage.

Prior art methods have used a "k" factor to account for differences between measured production and inferred production using the pump as a meter. In other words:

$$Rt = kRIP$$

where Rt is the calculated daily production rate, and RIP is the unadjusted inferred daily liquid rate. Ideally, the k factor is just below 1.0, for example in the range of 0.85 to 0.9. The k factor accounts for the fact that the assumptions about actual conditions mentioned above are not always correct. According to U.S. Pat. No. 7,212,923, (a) all pumps leak, at least slightly,
(b) tubing is not always anchored at or near the pump,
(c) a small volume of free gas is often present in the pump at the instant of traveling valve opening, and
(d) most oil shrinks as gas leaves it while passing up the tubing to the stock tank.

Ideally, the combined total of the effects mentioned above is small, such that the "k" factor is slightly less than 0.9.

Correcting Volume at Different Pressures and Temperatures

As mentioned, oil wells typically produce a mixture of oil, water, and gas. At downhole pressures and temperatures, these mixtures can exist in nearly pure gas phase, or nearly pure liquid phase. Typically, however, the fluid at down-hole pump conditions is a mixture of liquid and gas phases. When the fluid is brought to the surface and processed, more gas is extracted and the liquid volume decreases. This result is referred to as "shrinkage."

Oil operators traditionally measure fluid at surface pressure and temperature conditions. Yet pump metering techniques can only measure volumes at down-hole pump conditions. Therefore in order to provide an adequate replacement for surface volume measurement, any practical pump metering system should compensate for fluid density changes that result from pressure and temperature changes. Mathematical relationships used to correct between volumes measured at varying temperatures and pressures are commonly available in the industry.

Determination of Net Stroke from Pump Card

Typical reciprocating rod pump (RRP) installations rely on a pumping unit to reciprocate a long string of rods from the surface. The pump is located in the well at distances ranging from hundreds of feet to several thousand feet from the surface. Mathematical models are applied to the surface measurements of rod displacement and force to model the rod displacement and force at the downhole end of the rod string. The resulting downhole dynamometer or "pump card" represents the expected motion and load of the pump plunger.

Estimation of gross liquid production from the pump can be performed by considering the motion of the moving plunger relative to the standing valve. It is traditional to consider that the standing valve is attached to the tubing string. As fluid load is transferred between the plunger and the tubing, the long rod from the downhole pump to the surface expands and contracts. Those downhole "pump" motions, characterized by a load (force) versus plunger position graph for downhole conditions, can be very different from the surface dynamometer, or rod force versus rod position graph at the surface. The prior art applies mathematical models to surface measurements of force and displacement of the rod string, in order to estimate downhole force and displacement of the pump, that is, the pump card.

Estimation of net pump stroke requires detailed interpretation of the pump card. See FIG. 1 which shows a pump card. The opening and closing positions of both the standing and the traveling valve must be identified. The fluid load lines must also be identified. The existence of the fluid load lines is a direct result of the opening and closing of the standing and traveling valves.

An ideal pump card demonstrates a stable load (FLus) during most of the upstroke and a different stable load (FLds) during most of the downstroke. See the load lines FLus and FLds on FIG. 1. The stabilized pump load during the downstroke (FLds) should correspond to the buoyant force on the bottom of the rod string, if the pump card were generated using "true loads". If the pump card were generated using "effective loads," FLds should be at zero pounds force. On the upstroke, the stabilized load (FLus) should be offset from the downstroke stabilized fluid (FLds) by an amount equal to the cross-sectional area of the pump multiplied by the pressure difference across the pump plunger.

The standing valve is the appropriate reference point for measuring production through the pump. FIG. 1 depicts an idealized "full" card for the general case. The offset in plunger position between closing of the traveling valve TVC and opening of the standing valve SVO is caused by a number of factors. First, there is an amount of plunger movement which must occur to counteract tubing contraction. As the traveling valve, plunger and rod string begin to take on the fluid load, the tension on the bottom end of the tubing decreases. This allows the tubing string to contract. During the transition from TVC to SVO, the pressure differential across the plunger is increasing. Any time there is a pressure difference across the plunger, there will be some leakage. Before the standing valve can open, the traveling valve must move enough distance to not only offset the tubing contraction ($S_t$), but also offset the amount of liquid which has leaked around the plunger during the early portion of the upstroke ($S_{leakage\ (TVC-SVO)}$). Other factors, such as delayed traveling valve sealing caused by a "tight" ball catcher, can also add to the offset in position between TVC and SVO ($S_{other}$). See FIG. 1.

U.S. Pat. No. 7,212,923 describes a procedure that accounts for the offset between TVC and SVO using only a calculated estimate of tubing contraction ($S_t$). When an estimation of $S_{leakage}$ is not applied to actual field data, the result is over-estimation of the net pump stroke, because the total offset in position between TVC and SVO exceeds that predicted by the tubing contraction $S_t$ calculation.

Compensating for Pump Leakage (Slippage)

RRP's operate at very high pressures (hundreds to thousands of pounds force per square inch) in downhole conditions. These pumps are often intentionally designed to allow a certain amount of fluid to leak through the primary pump seals. This leakage is sometimes called "slip". In order to use the pump as a meter, the amount of "slippage" must be accurately determined.

In the technical field of RRP's, several investigators have attempted to mathematically model the slippage through a RRP using known characteristics of the pump and of the fluid being pumped. A published Master's Thesis by Richard Chambliss in 2001 provides a good review of these efforts. As Chambliss pointed out, attempts to experimentally validate these mathematical models have been troublesome, at best. Even under laboratory conditions where all of the parameters entered into the model are known, there is still a considerable amount of uncertainty in the results. In actual field conditions, however, even the parameters input into the mathematical models (pump clearance, fluid viscosity, plunger-barrel eccentricity) are not known. Therefore practitioners in the industry cannot rely on any of these models as a means to correct positive displacement pump meters for slip.

Gibbs and Nolen in an August 1990 article in the publication, SPE Production Engineering, proposed a series of methods for measuring pump leakage (slip) "in situ" for a single stroke of an RRP. These practical field procedures (and adaptations of those techniques) have been employed with varying degrees of success for more than two decades. More recently, Gibbs and Nolen proposed in U.S. Pat. No. 7,212,923 using these techniques in a wellsite controller to continuously infer production from a RRP system.

Gibbs and Nolen proposed several alternative approaches for estimating RRP slippage. They suggested that their "Pump Card Method" ("923" patent, column 10, line 40) is more applicable to "severely worn" pumps. Presumably this means pumps with high slippage.

They described another ("Traveling Valve Load Loss Rate") ("923" patent, column 12, line 35) method using the phrase "works well in all cases as long as the load loss trace is not nearly vertical."

A third alternative method ("rolling stop" method) was suggested in cases where the "Traveling Valve Load Loss Rate" is not appropriate.

Gibbs and Nolen therefore, suggest that an automatic well controller device when used to estimate production may implement one of three separate slippage estimation techniques. No direction is provided as to how to select which one of the three methods to use for an actual pumping well in an oilfield.

The "Pump card method" has proven difficult to implement even when a human attempts to interpret the data. The "Pump card method" involves subtle interpretation of the derivative of the pump card data. Downhole pump cards are the result of a complex chain of calculations derived from raw data which includes a degree of error or noise. The result is that downhole cards can be "noisy" and tend to have fairly low resolution in time. When these low resolution, "noisy" data are differentiated in an attempt to apply the "Pump card Method", the "noise" is dramatically amplified. As a result, the "standard valve opening" (SVO) time is difficult (sometimes impossible) for even a human to identify. Logic designed for a controller to interpret this data, almost certainly results in frequent erroneous selection of "standing valve opening" time, thereby yielding incorrect estimates of pump leakage. Therefore, the Gibbs and Nolen "Pump Card method" does not provide a generally useful method of estimating pump leakage across a broad range of oilfield installations.

The Gibbs and Nolen "Traveling Valve Load Loss Rate" method is the most commonly utilized leakage estimation procedure in the industry. This method involves stopping the RRP system during the "upstroke" when the load of the produced fluid column is carried by the RRP traveling valve. (See TVC of FIG. 1). The axial tension (load) of the drive string is measured after motion is stopped. Gibbs and Nolen relate the load loss rate to strain in the rod and tubing strings. This strain is then considered to result in downhole pump plunger movement. Gibbs and Nolen proposed a procedure for interpreting this data which involves selecting three points on the load decline curve. A second order polynomial (parabola) is forced to fit these three points, and the equation of the parabola is differentiated to obtain a load loss rate (lbf/sec). The load loss rate is then converted to a strain rate in inches/sec using elasticity and cross-sectional area of the rod string and any unanchored tubing. Gibbs and Nolen then apply this strain rate to the cross-sectional area of the pump to determine an associated pump displacement rate in BPD.

According to Gibbs and Nolen, this procedure results in an estimate of maximum leakage rate (in BPD) which can be applied using a "leaking coefficient" ($C_p$) thereby providing a total leakage determination.

Although the Gibbs and Nolen "Traveling Valve Load Loss Rate" method and variants of the technique have been widely used throughout the industry for many years, no literature can be found which challenges or confirms the validity of the "Traveling Valve Load Loss Rate" procedure.

A review of the Nolen, Gibbs paper of SPE Production Engineering, August 1990, and U.S. Pat. No. 7,212,923 of Gibbs identifies a number of shortcomings of this technique.

Time-Dependent Leakage

The "Traveling Valve Load Loss Rate" technique includes an interpretation procedure which relies on the polished rod load vs time data. Gibbs and Nolen did not provide any theoretical basis for assuming a relationship between leakage rate and time.

Second Order Approximation

In the August 1990 paper of Nolen, Gibbs, equations are presented which can be used to fit a second order equation (parabola) through three points selected by an analyst from the polished rod load vs time data. Nolen and Gibbs presented no theoretical or other argument to support the use of a second order approximation of the (load vs time) data. In fact, the figures described below illustrate how poorly the second order equation approximates the entire load decline curve.

FIG. 2 is a graph of raw load decline data from an actual "traveling valve check".

FIGS. 3, 4 and 5 depict this same data along with the Nolen, Gibbs second order approximation curve. In each case, a different set of three points was selected for the curve fit.

In all three cases, the second order equation does a very poor job of approximating the entire raw data set.

Highly Subjective Interpretation

| FIG. | Nolen-Gibbs $k_1$ [lbf/sec] | Nolen-Gibbs Leakage [BPD] |
|---|---|---|
| 3 | −280 | 27.5 |
| 4 | −231 | 22.7 |
| 5 | −395 | 35.3 |

FIGS. 3 through 5 illustrate the subjectivity of "Traveling Valve Load Loss Rate" interpretation. Simply by moving the selected points to different locations on the load decline curve, the calculated leakage can vary dramatically. In the three cases displayed, the leakage rates were calculated to be 27.5, 22.7, and 35.3 BPD, respectively (representing up to 24% deviation from the mean value). Such variability in leakage estimates is highly undesirable.

Incompressible Fluid Assumption

In relating polished rod load loss to leakage rate (via plunger movement), the Gibbs and Nolen model (without explicitly stating) is based on several assumptions:

Pump plunger expansion due to internal-external pressure difference is negligible;

Pump barrel expansion due to internal-external pressure difference is negligible; and Fluid inside the barrel is incompressible.

The first two assumptions are generally valid, because engineering calculations show that plunger and barrel expansions are very small.

However, operational conditions can easily invalidate the assumption of incompressible fluid. If the fluid entering the pump has any free gas content or if the barrel is incompletely filled at the time that the polished rod is stopped for a traveling valve test, the fluid in the pump barrel will be highly compressible. In these cases, the correlations between plunger movement and leakage rate assumed by Gibbs and Nolen are invalid.

The Gibbs and Nolen "Traveling Valve Load Loss Rate" method calculates fluid leakage as being equal to the plunger movement (attributable to the contraction of the rod string due to load loss) times the plunger cross-sectional area. However, critical analysis reveals that for a system containing a compressible fluid, the actual leakage rate is that calculated by Gibbs and Nolen plus enough fluid to compensate for the compression of the liquid already in the barrel to its new, elevated pressure.

Problems with fluid compressibility are most serious during the very early parts of the traveling valve leakage test, where the pressure in the barrel is lowest. However, this is also the portion of the data which is most crucial to the Gibbs and Nolen interpretation. Therefore, the fluid compressibility phenomena can introduce significant error into the leakage calculations.

If the pump barrel contains compressible fluid, actual leakage rates will be significantly higher than those calculated by the Gibbs and Nolen "Traveling Valve Load Loss Rate" technique.

IDENTIFICATION OF OBJECTS OF THE INVENTION

An object of this invention is to provide improvements in the accuracy of determining traveling valve/plunger leakage rates and inferred production of a downhole pump of an oil and gas well.

Another object of the invention is to improve the accuracy of inferred production estimates over prior techniques by more accurately determining the effective plunger stroke and by more accurately estimating plunger leakage.

Another object of the invention is to provide a method for determining traveling valve/plunger leakage rates and inferred production that is completely objective requiring no human interpretation.

SUMMARY OF INVENTION

In at least one embodiment of the invention, the leakage test interpretation can be totally automated by incorporating logic in an onsite controller.

In another embodiment, the leakage test can be automatically performed by a wellsite controller supervising a variable speed drive. The invention provides accurate inferred production values which can replace conventional well production testing.

According to one aspect of the invention, a method is provided for determining traveling valve/plunger leakage rate in a subsurface pump by first stopping the rod string at the surface during an upstroke. The surface axial load on the rod string is determined for a plurality of times until the axial load has stabilized. Next, the slope dF/dt is determined from polished rod load vs. time data. Next, a subset of the dF/dt vs. axial load data is selected. Next, linear regression is applied using dF/dt as the dependent variable and axial load as the independent variable to derive a best fit line to the selected data. Next, the total stress/strain ratio is calculated for the rods and tubing. The slope of the linear regression line and the total stress/strain ratio are used to determine the plunger leakage rate.

According to another aspect of the invention, a method is provided for determining traveling valve/plunger leakage rate in a subsurface pump. The method includes first selecting a number of tests to perform, and for each of the selected tests, stopping the rod string at the surface during the upstroke, determining the surface axial load on the rod string for a plurality of times until axial load is stabilized, and determining dF/dt from the curve of polished rod load vs. time data, next, a subset of dF/dt vs. axial load data is selected for analysis, next, a derivation using linear regression is performed to determine a best fit line to the selected data using dF/dt as the dependent variable and axial load as the independent variable, next, the total stress/strain rates for the rods and tubing is calculated from the best fit line, and next, the plunger leakage rate is determined as a function of the slope of the linear regression line and the total stress/strain ratio.

According to another aspect of the invention, a method for determining traveling valve/plunger leakage rate in a subsurface pump includes the steps of, measuring actual production of a well over a specific period of time to produce a well production measurement, for the specific period of time for the well production measurement, computing a downhole pump card for each stroke of the subsurface pump, for each stroke of the pump, calculating $S_n$ and $\Sigma\Delta(F)*\Delta(t)$, accumulating $\Sigma S_n$ and $\Sigma(\Sigma(\Delta(F)*\Delta t))$ for all strokes, and determining plunger leakage rate from, $$LKG = \frac{\sum S_n - \frac{12354*(V_{pf} - V_{pi})}{(F_{shrinkage}(D^2))}}{\sum (\sum \Delta(F)*\Delta(t))}.$$

According to another aspect of the invention, a method for determining a traveling valve/plunger leakage $S_{LKG}$ in a subsurface pump includes the steps of computing a pump card, selecting a beginning time and end time from the pump card for determining plunger leakage, selecting a baseline load, for each point in the pump card between the selected beginning and ending time, calculating $\Delta(F)$ using the logic, $$\text{if } \frac{((\text{load}(i) + \text{load}(i-1))}{2} > \text{baseline load, then,}$$

$$\Delta(F) = \frac{((\text{load}(i) + \text{load}(i-1))}{2} - \text{baseline load}$$

otherwise, $\Delta(F)=0$, accumulating $\Sigma(\Delta(F)*\Delta(t))$ for all points in the time range, and determining plunger leakage volume according to the equation, $S_{LKG}=LKG*\Sigma(\Delta(F)*\Delta(t))$.

According to another aspect of the invention, a method of determining the net liquid production for a single stroke of a pumping unit based on one of the determinations of leakage LKG as described above is determined by first calculating a pump card.

Next $S_n$ and $\Sigma(\Delta(F)*\Delta(t))$ are determined from the pump card where $S_n$ is the net stroke from the pump card in inches of plunger stroke and $\Delta(F)$ is determined as indicated above.

Next, $S_{lp}$, (net liquid produced for a single stroke of the pumping unit) is determined from the relationship, $S_{lp}=(S_n-(LKG*\Sigma(\Delta(F)*\Delta(t))))$.

Next $S_{lst}$, (net liquid produced at stock tank conditions for a single stroke) is determined.

Finally, inferred daily liquid production rate $Q_d$ in stock tank barrels per day is determined for $$Q_d = \frac{6.994 \sum S_{lst}}{T_p + T_d}$$

where $T_p$ is the cumulative producing time during the day and $T_d$ is the cumulative down time during the day.

DESCRIPTION OF THE INVENTION

Estimating Leakage Rate from a Traveling Valve Check

Figure 1:
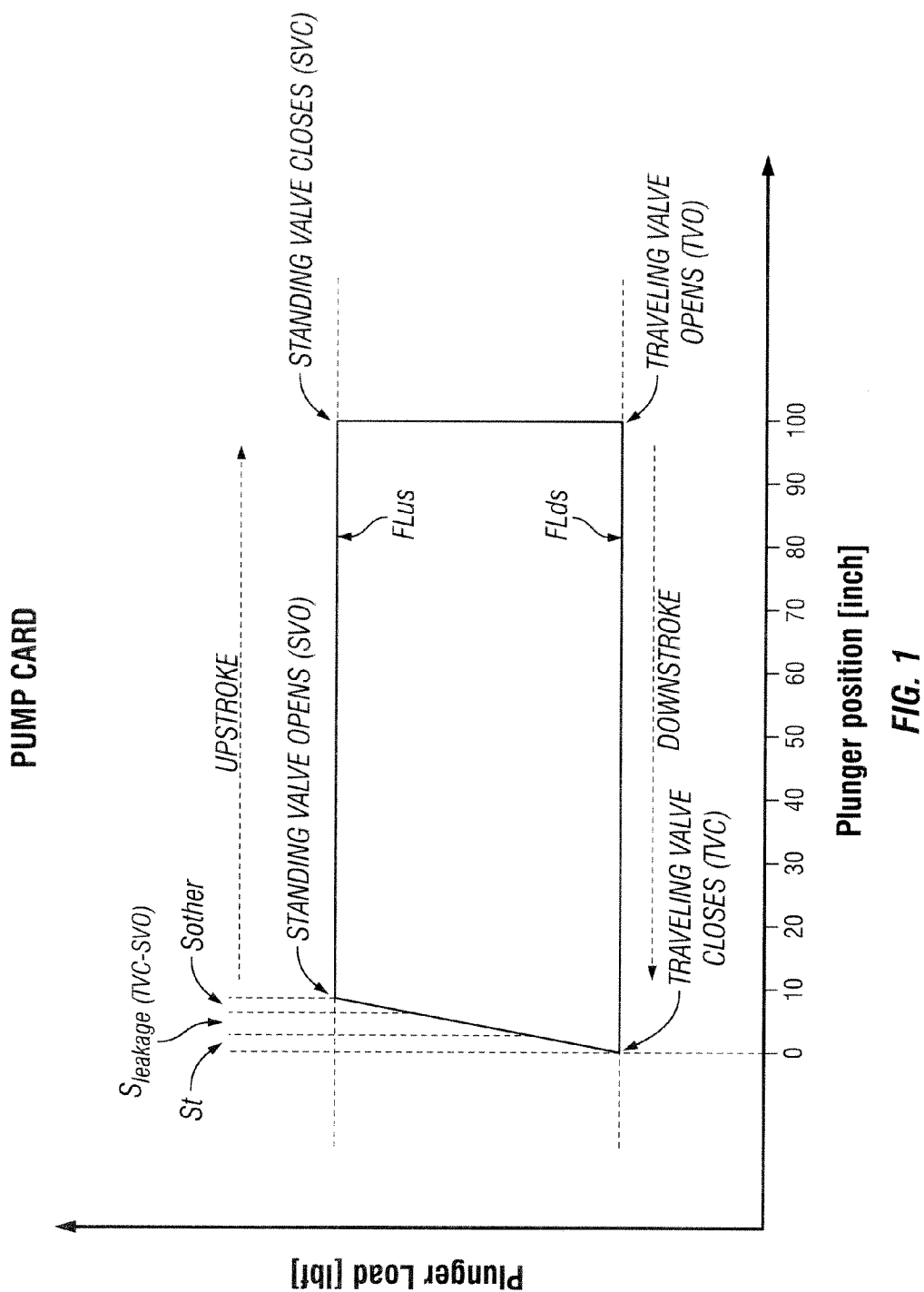
FIG. 1 illustrates an ideal pump card with valve opening and closing positions and with fluid load lines.
Figure 2:
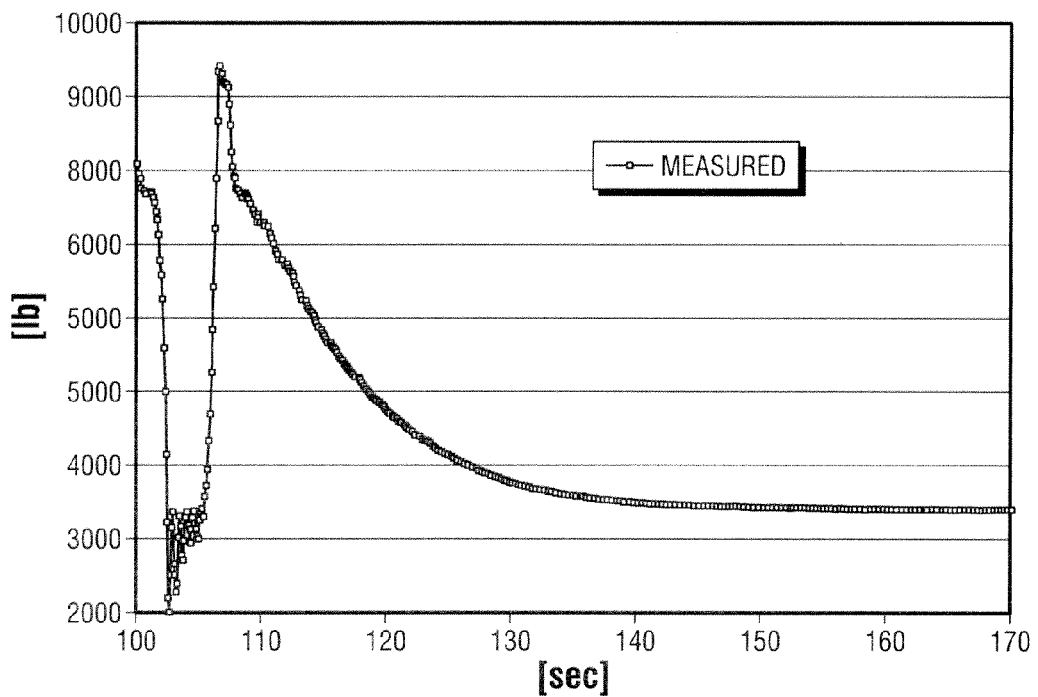
FIG. 2 is a graph of raw polished load vs. time from an actual traveling valve check.
Figure 3:
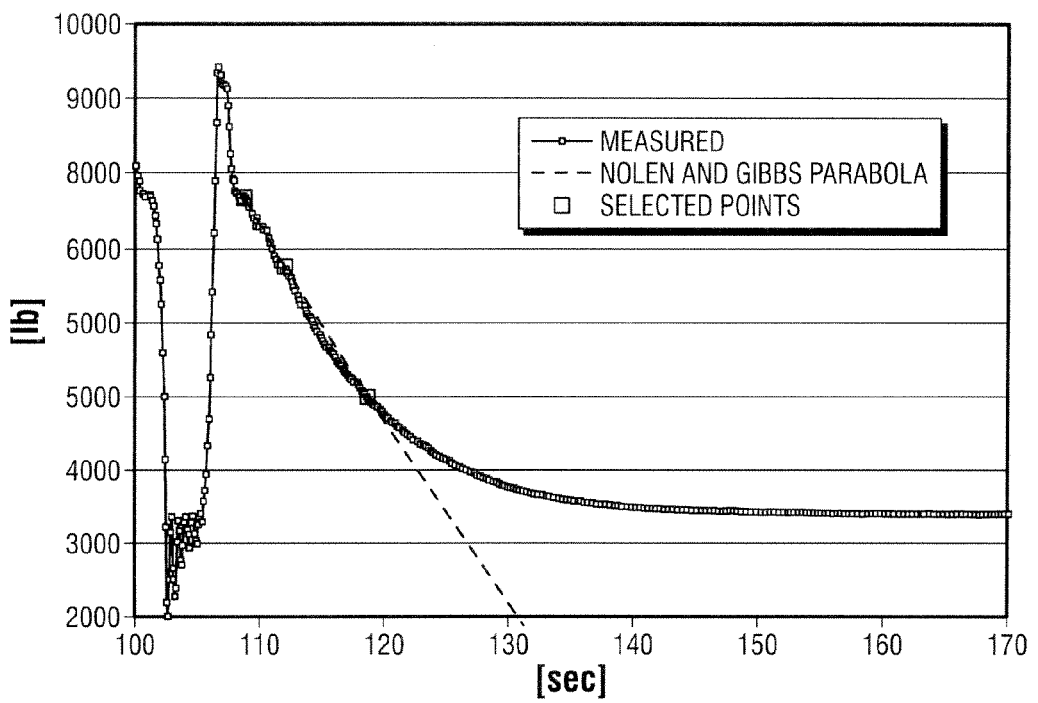
FIGS. 3, 4 and 5 show the raw polished load vs. time data of FIG. 2 with a Nolen and Gibbs second order approximation curve, where each of the figures show a different set of three points selected for a curve fit.
Figure 4:
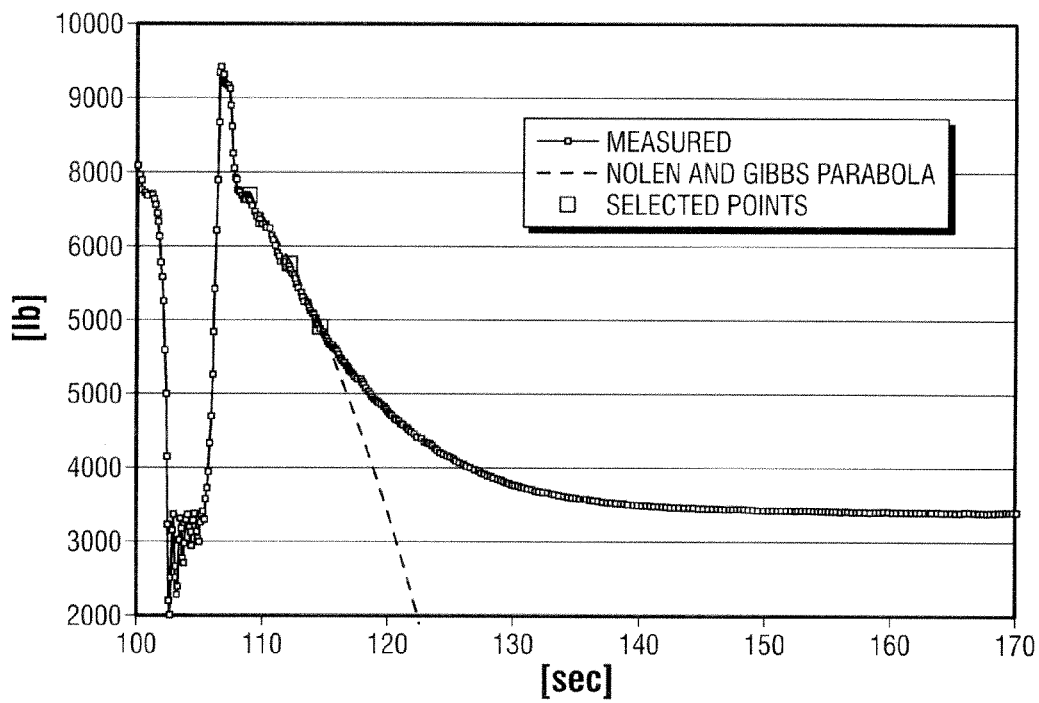
Figure 5:
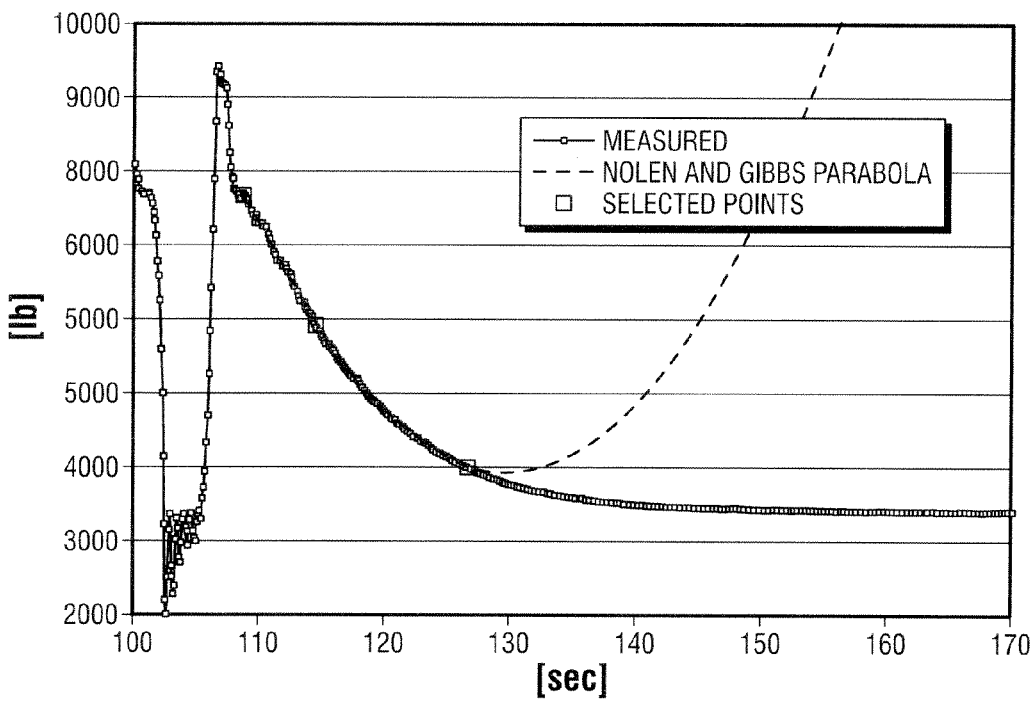

One aspect of the invention includes a method for interpreting the "traveling valve test". This test is performed by stopping the pumping unit during the upstroke and measuring load on the polished rod vs time. See the upstroke portion of the pump illustrated in FIG. 1. See also FIGS. 6A and 6B which illustrate a full pump card and plunger positions and plunger loads during a pump cycle.

Figure 8A:
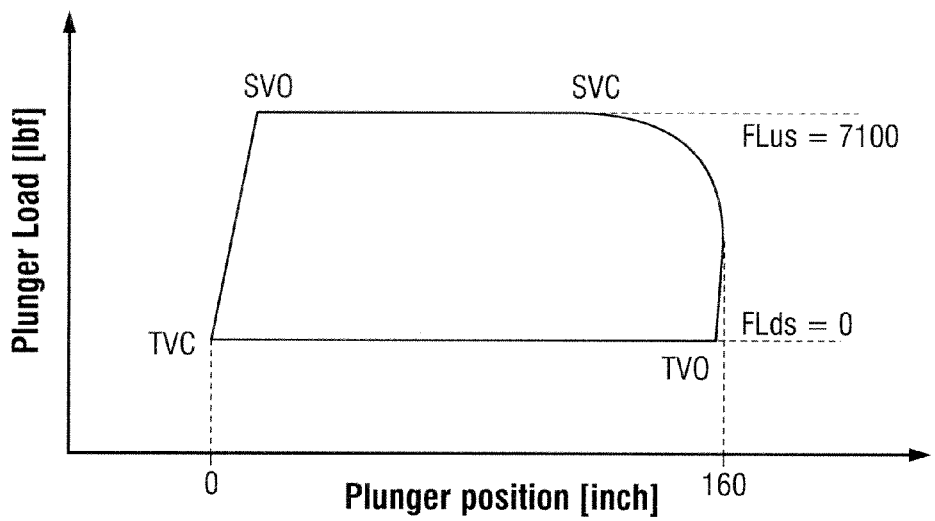
FIGS. 8A and 8B illustrate a pump card and plunger movement for a down-hole pump with early Standing Valve Closing.
Figure 8B:
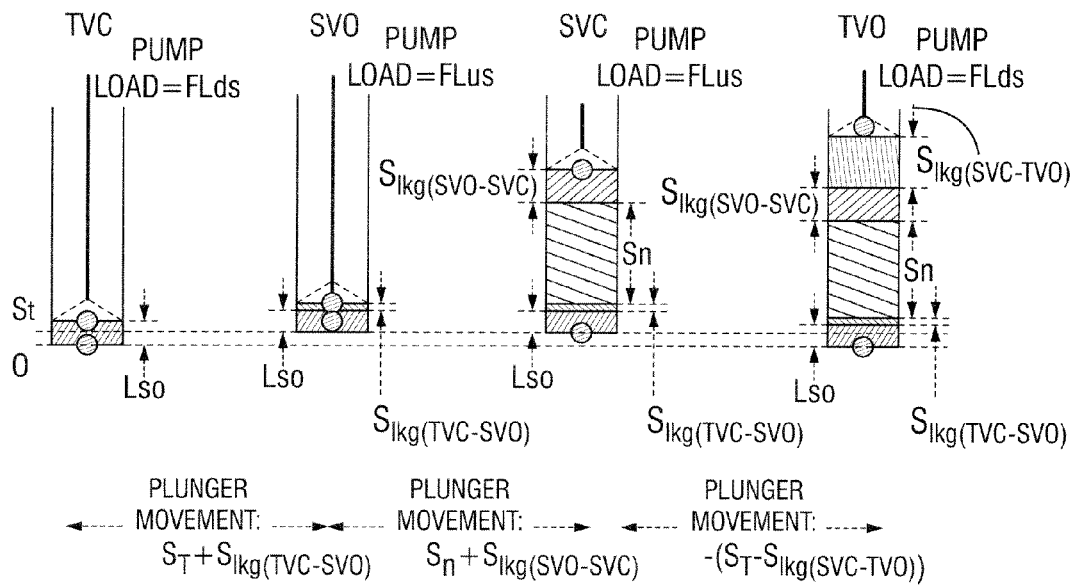

See also FIGS. 8A and 8B which illustrate a pump card and plunger movement for a downhole pump with early standing valve closing.

Figure 9A:
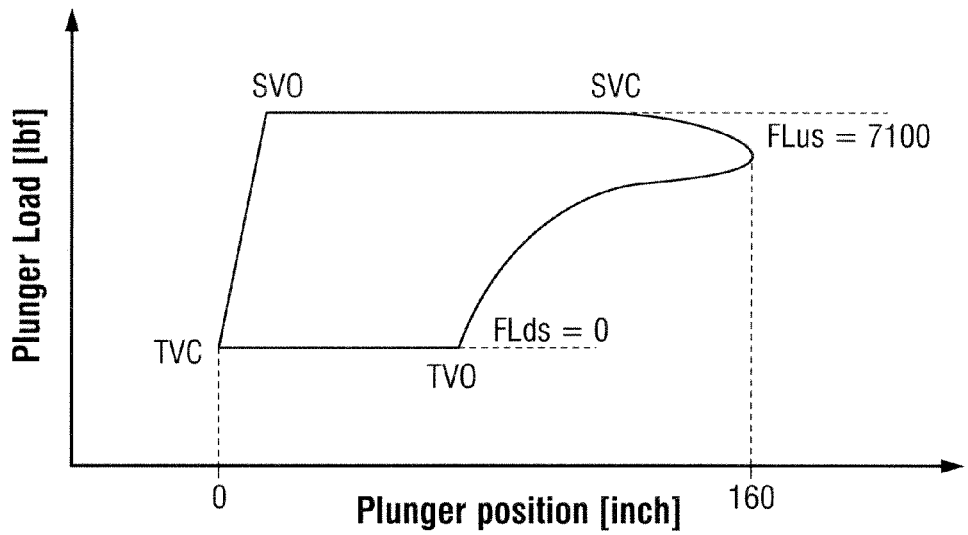
FIGS. 9A and 9B illustrate a pump card and plunger movement for a down-hole pump with incomplete fillage and early standing valve closing.
Figure 9B:
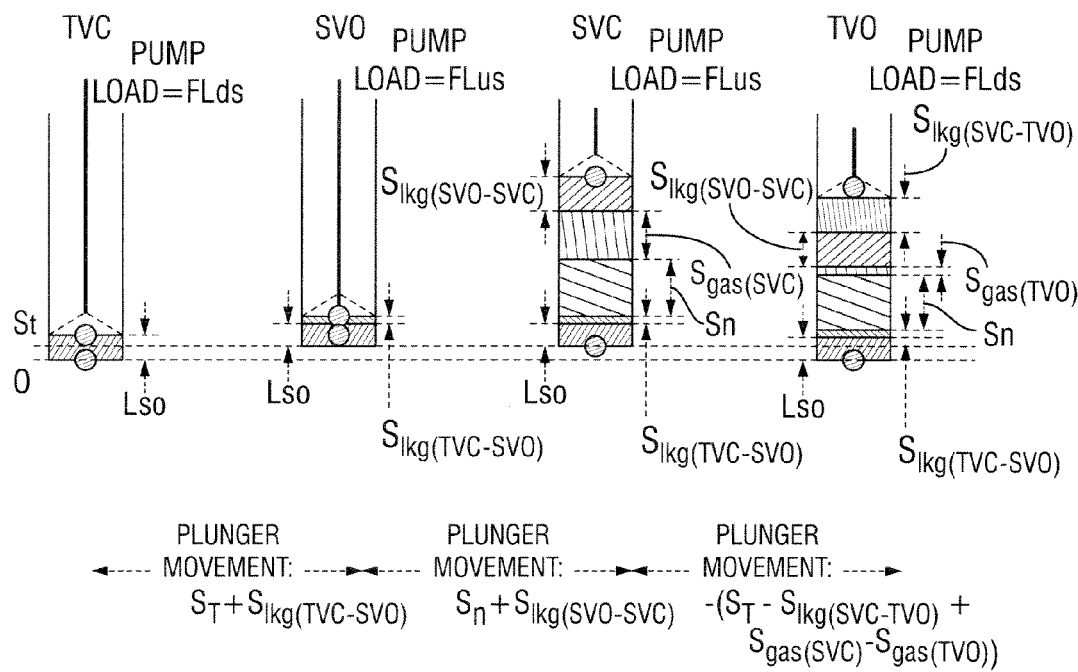

FIGS. 9A and 9B illustrate a pump card and plunger movement for a downhole pump with incomplete fillage.

There is general agreement among theoretical investigators that instantaneous plunger traveling valve leakage rate is proportional to pressure differential across the pump, or:

$$Q_{leakage} = C_x * \Delta P_{plunger} \quad (1)$$

where,
$Q_{leakage}$ is the instantaneous plunger/traveling valve leakage rate,
$\Delta P_{plunger}$ is the instantaneous pressure difference across the plunger, and
$C_x$ is a constant.

As was shown in the 1990 SPE Production Engineering paper by Gibbs and Nolen, the instantaneous leakage rate during the traveling valve check can be quantified by equation 2, $$Q_{leakage} = \frac{\Delta F_{pmp}}{\Delta t} * L/(EA)_{tot} * A_p \quad (2)$$

where,
$\Delta F_{pmp}$ is the change in axial load at the pump,
$\Delta t$ is the time period over which the change occurred,
$L/(EA)_{tot}$ is the total stress strain conversion factor for the rods and any unanchored tubing, and
$A_p$ is the area of the pump plunger.

Combining equations (1) and (2) yields equation (3):

$$C_x * \Delta P_{plunger} = \frac{\Delta F_{pmp}}{\Delta t} * L/(EA)_{tot} * A_p \quad (3)$$

During the upstroke of a RRP, the axial load, $\Delta P_{plunger}$, on the pump "pull rod" is directly proportional to the pressure difference across the pump.

$$\Delta P_{plunger} = (1/A_p) * F_{pump} \quad (4)$$

where,
$A_p$ is the area of the pump plunger, and
$F_{pump}$ is the force on the pump "pull rod."

Substituting equation 4 into equation 3 and solving for $\Delta F_{pump}/\Delta t$, $$\frac{\Delta F_{pmp}}{\Delta t} = \frac{C_x}{A_p^2 * L/(EA)_{tot}} * F_{pmp}. \quad (5)$$

Shortly after the pumping unit is stopped (for the "traveling valve check") and dynamic effects die out, the polish rod load can be considered to be a gauge of the pressure difference across the pump plunger, that is, $$\Delta F_{pr} = \Delta F_{pmp} \quad (6)$$

and, $$F_{pf} - F_{rbnt} - F_{fresid} = F_{pmp}, \quad (7)$$

where,
$\Delta F_{pr}$ is change in axial load at the polished rod,
$\Delta F_{pmp}$ is change in axial load at the pump,
$F_{pr}$ is axial load at the polished rod,
$F_{rbnt}$ is buoyant rod weight, and
$F_{fresid}$ is residual Coulomb friction force of the stuffing box, and pump friction.

Substituting equations (6) and (7) into equation (5) yields, $$\frac{\Delta F_{pr}}{\Delta t} = \frac{C_x}{A_p^2 * L/(EA)_{tot}} * (F_{pr} - F_{rbnt} - F_{fresid}). \quad (8)$$

Equation 8 indicates that a plot of load loss rate vs polished rod load, $F_{pr}$, should be linear. The slope of this line, $(M_{ls})$, provides a means a deriving pump leakage rate at different points in the plunger stroke.

It can be shown that:

$$C_x = A_p^2 * L/(EA)_{tot} * M_{ls}$$

Figure 7:
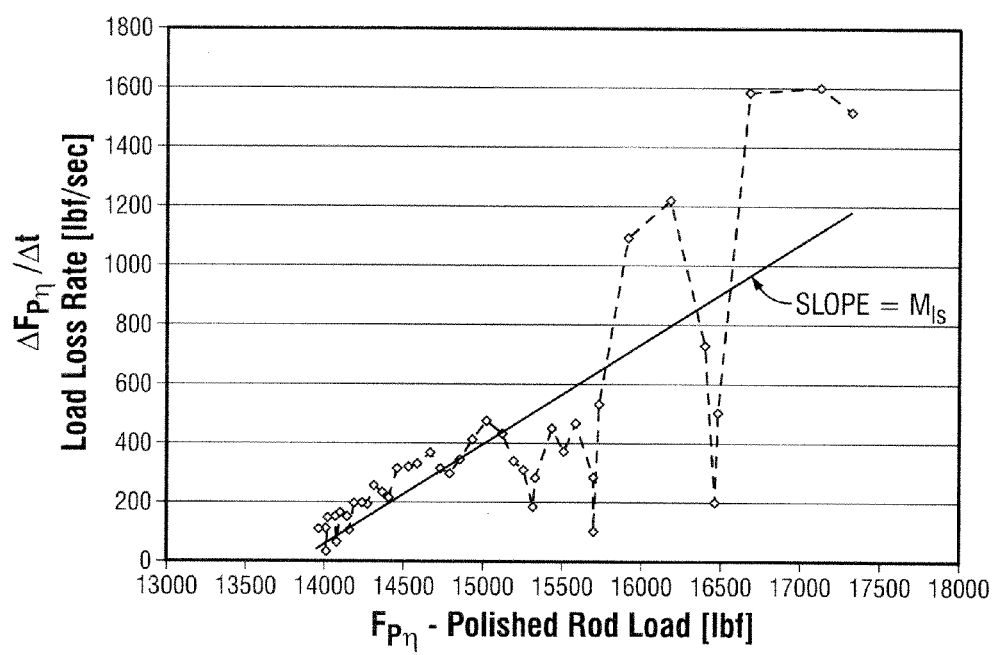
FIG. 7 illustrates a plot of actual load loss rate of polished rod load data with a linear regression applied to the raw data to derive a linear approximation to the data and determine the slope of the linear regression line to provide a basis for leakage estimates for subsequent pump cards from the well.
Figure 10:
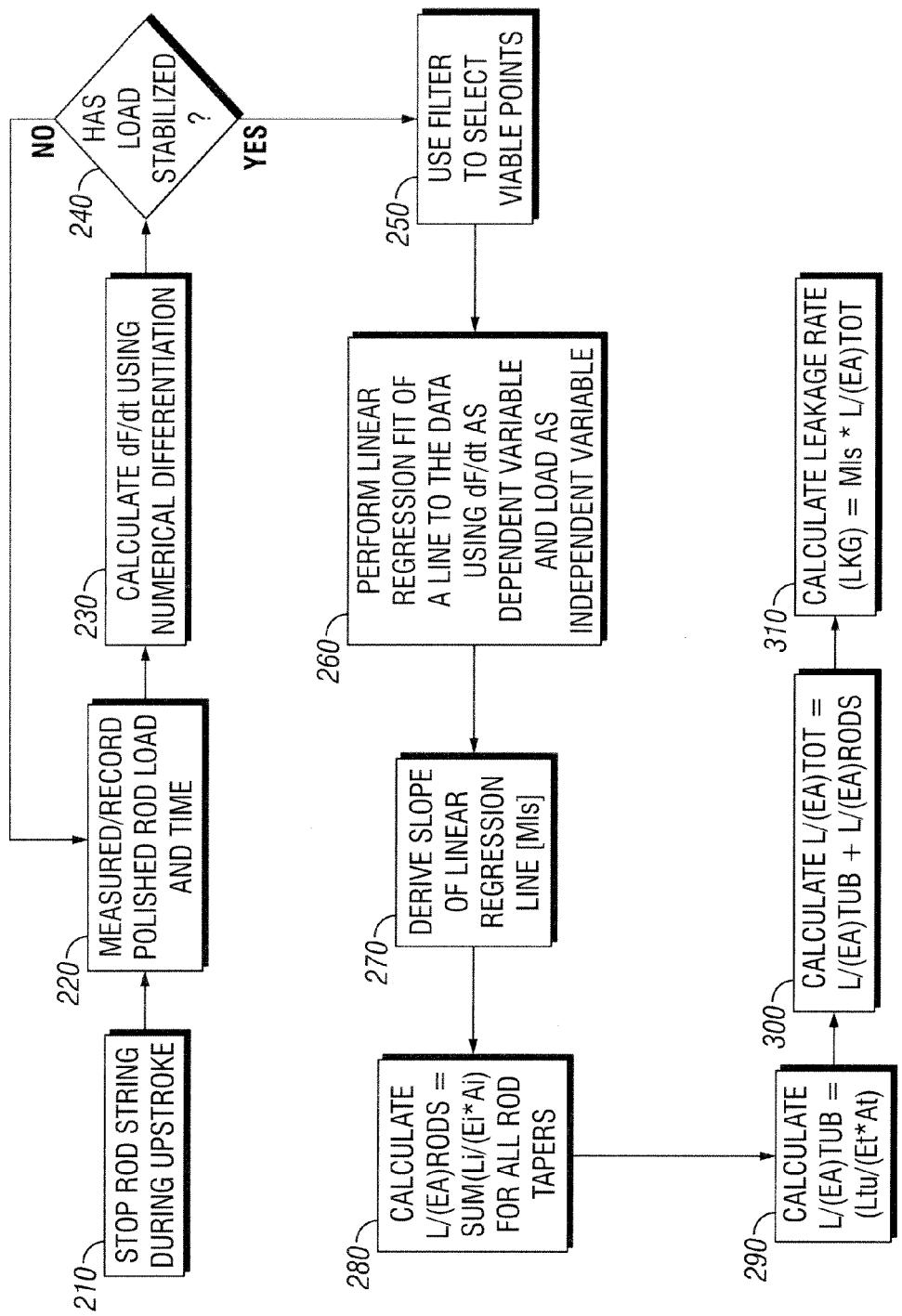
FIG. 10 is a flow chart of the steps for determining the leakage calculation from the traveling valve check, according to the invention.

FIG. 7 provides an example plot of actual data from a traveling valve test using this interpretation. Linear regression has been applied to the raw data to derive a linear approximation of the data. The slope of this linear regression line, $(M_{ls})$, [1/sec] becomes the basis for leakage estimates for subsequent pump cards from the well. FIG. 10 shows the steps required to determine the leakage rate LKG as a function of $M_{ls}$.

Superposition of Traveling Valve Check Tests as a Means of "Noise Reduction"

The raw data displayed in FIG. 7 exhibit a degree of "scatter" or "noise".

The invention described herein includes a method for statistically reducing the "noise" in an effort to acquire more accurate estimates of pump leakage rate.

The relationship which results in equation 8 should be repeatable. Therefore, it is desirable to perform multiple "traveling valve checks" (on the same well) consecutively over a short period of time. The raw data ($\Delta F_{pr}/\Delta t$ vs $F_{pr}$) from all of the consecutive tests are combined and subjected to a single linear regression process. The resulting slope value $(M_{ls})$ will (statistically) be more accurate than that derived from a single "traveling valve" check.

Figure 11:
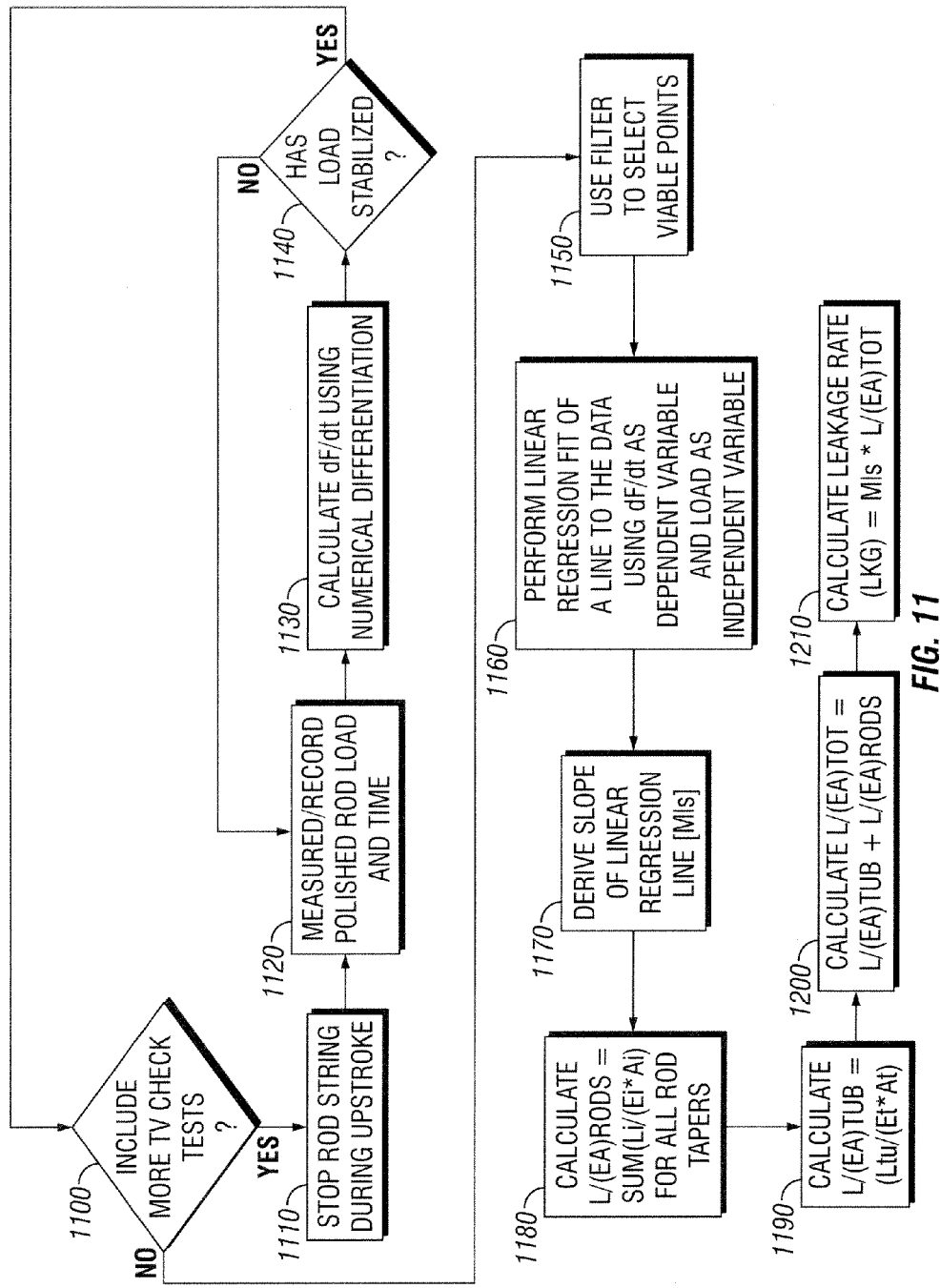
FIG. 11 is a flow chart of the steps for determining the leakage calculation using superimposed traveling valve checks.

FIG. 11 is a flow chart for calculation of LKG based on the analysis above. FIG. 11 illustrates leakage calculation using superimposed traveling valve checks as described above. First, a number of tests to perform is selected as indicated by logic box 1100.

In each test, the rod string is stopped at the surface during the upstroke of the pump, as indicated by logic box 1110 and the "YES" branch of the logic box 1100. The surface axial load on the rod string is measured or inferred for a plurality of times until axial load has stabilized, as indicated in logic box 1120. Next, as indicated by logic box 1130, the parameter dF/dt representing polished rod load vs. time is determined.

Next, it is determined whether the load has stabilized, as indicated by logic box 1140. If the load is not stabilized, indicated by the "NO" branch of the logic box 1140, the surface axial load and time of the rod string is measured/recsordered again, as indicated by logic box 1120. If the load is stabilized, indicated by the "YES" of the logic box 1140. Next, it is determined if more traveling (TV) valve check tests are to be included, as is indicated by logic box 1100.

Next, if no more traveling valve (TV) check tests are to be included, the "NO" of logic box 1100 is followed. Next, a subset of the dF/dt vs. axial load data is analyzed according to logic box 1150. Next, linear regression is applied using dF/dt as the independent variable, and axial load as the independent variable to derive a best fit line to the selected data as indicated by logic box 1160. Next, the slope of the linear regression line [Mls] is derived, as indicated by logic flow chart box 1170. Next, the stress/strain conversion factor for the rod string $(L/EA)_{rods}$ is determined according to the equation of logic box 1180. Next, the stress/strain conversion factor for the (unanchored) tubing $(L/EA)_{tub}$ is determined according to the equation of logic box 1190. Next, the plunger leakage rate, as indicated by logic box 1210, is determined as a function of the slope of the linear regression line, as indicated by logic box 1170 and the total stress/strain ratio as indicated by logic box 1200.

Use of Leakage Rate for Pump Leakage Calculations

The invention includes a method of applying the plunger leakage rate to a pump card for the purpose of estimating plunger leakage during an arbitrary portion of the stroke.

After the pump card is computed, the fluid load lines $FL_{us}$, $FL_{ds}$ and valve open/close locations (See FIG. 6A) are identified. Analysis of equation (1) suggests that any time the pump card load exceeds $FL_{ds}$, the plunger will leak fluid. Further analysis leads to the understanding that the leakage rate is proportional to the pump load. More specifically, the instantaneous leakage rate (expressed as inches of pump stroke) can be calculated as:

$$S_{lkg}/\Delta t = LKG*(F-FL_{ds}) \tag{9}$$

where, $S_{LKG}$ is plunger leakage volume expressed in equivalent inches of plunger movement, $\Delta t$ is elapsed time, F is the instantaneous pump load, and LKG is a term of convenience defined by equation 10, $$LKG = M_{ls}*L/(EA)_{tot} \tag{10}$$

FIG. 10 presents a flow chart based on the analysis above as to the steps in calculating leakage rate. All of the steps described in the flow charts or FIGS. 10-16 are performed in a digital computer of the well manager (not illustrated, but see controller 52 of FIG. 1 of U.S. Pat. No. 7,212,923 which is incorporated herein). The well manager maintains and controls operation of a reciprocating rod pump as described above.

First, as indicated by logic flow chart box 210, the rod string is stopped at the surface during an upstroke of the pump. Next, as indicated by logic boxes 220, 230, and 240, the surface axial load of the rod string is measured a plurality of times until axial load has stabilized. The surface axial load and time of the rod string is measured/recordered, as indicated by logic flow chart box 220.

Next, the slope, dF/dt is determined from polished rod load vs time data as indicated by logic box 230. Next, it is determined whether the load has stabilized, as indicated by logic box 240. If the load is not stabilized, indicated by the "NO" branch of the logic box 240, the surface axial load and time of the rod string is measured/recordered again, as indicated by logic flow chart box 220. If the load is stabilized, indicated by the "YES" of the logic flow chart box 240, a subset of the dF/dt vs axial load data is selected for analysis as indicated by logic box 250. Next, linear regression is applied using dF/dt as the independent variable to derive a best fit line to the selected data as indicated by logic box 260. Next, the slope of the linear regression line [Mls] is derived, as indicated by logic flow chart box 270. Next, the stress/strain conversion factor for the rod string is determined according to the equation of logic box 280. Next, the stress/strain conversion factor for the (unanchored) tubing is determined according to the equation of logic box 290. Next, the total stress/strain ratio for the rod and tubing is determined according to the equation of logic box 300. The leakage rate is determined (see logic box 310) using the slope of the regression line (determined in logic box 270) and the total stress/strain ratio as determined by logic box 300.

Using this relationship, plunger leakage can be computed for any portion of the pump card. The load vs time data from the pump card can be numerically integrated using the trapezoidal rule to derive a total leaked volume (expressed here as inches of plunger travel), $$S_{LKG} = LKG*\Sigma\{[(F_{i-1}+F_i)/2 - FL_{ds}]*(t_i-t_{i-1})\} \tag{11}$$

Estimating Leakage Rate from a Traditional Production Test

The invention further includes a method of estimating the plunger leakage rate using a comparison of pump card data to measured (not inferred) production data at the surface.

A field production test is performed wherein the liquid production from the well over a period of time is measured in stock tank units. During this same period of time, a wellsite controller utilizes pump card information calculated on every stroke to derive net pump stoke and the summation of $\Delta F$ and $\Delta t$ from all strokes. A shrinkage term is introduced to account for changes in volume between pump conditions and surface conditions. This procedure facilitates estimation of LKG without a traveling valve check test.

By definition,

Vp is equivalent to Vg−Vl, where

Vp is the measured liquid production volume [STB],

Vg is gross volume moved by the plunger [plunger inches], and

Vl is volume that leaks through/around the plunger [plunger inches].

To reconcile units of measure, a conversion factor is provided to convert stock tank barrels to pump inches:

$$\frac{\pi D^2 [inch^2]}{4} \quad \frac{1[ft^3]}{1728[in^3]} \quad \frac{1[pumpBBL]}{5.615[ft^3]} * \frac{F_{shrinkage}[STB]}{1[pumpBBL]}$$

where,

D is the plunger diameter, $F_{shrinkage}$ is a shrinkage factor representing the ratio of surface volume to pump volume for a given mass of material [stock tank BBL/pump BBL], Simplification of the above relationship yields a conversion factor of, $$8.095E-5 * F_{shrinkage} * D^2 [STB/\text{inch}].$$

For the period included in the production test:

$$Vp = 8.095E-5 * F_{shrinkage} * D^2 (Vg[\text{inch}] - Vl[\text{inch}]) \quad (12)$$

But, for a series of pump strokes over time, $$Vg = \Sigma S_n, \quad (13)$$

where, $S_n$ is the net stroke from the pump card [inches of plunger stroke].

For that same series of strokes, the leakage (expressed as inches of plunger stroke) can be computed as, $$S_l = \Sigma(\Delta F * \Delta(t)) * LKG, \quad (14)$$

where,

F is the load in excess of downstroke fluid load, $$F = (F_{i-1} + F_i)/2 - FL_{ds}.$$

Substituting equation (13) and (14) into equation (12), $$Vp = 8.095E-5 * F_{shrinkage} * D^2 * \Sigma S_n - (\Sigma(\Sigma \Delta F * \Delta(t)) * LKG). \quad (15)$$

Solving for LKG, $$LKG = [\Sigma S_n - (12354 * Vp)/(F_{shrinkage} * D^2)] / [\Sigma(F * \Delta t)]. \quad (16)$$

A wellsite controller (i.e. wellsite manager) can analyze every stroke of the pump which occurs during the production test to accumulate the terms, $$\Sigma(F * \Delta t)$$

and, $$\Sigma S_n.$$

At the end of the test, the produced volume (Vp) becomes known from measurements taken at the surface. Several methods are available to derive $F_{shrinkage}$. (See FIG. 12) This permits computation of the pump leakage rate term (LKG) using equation 16.

The procedure described above provides a method of using measured production data along with rigorous analysis of pump cards to derive a pump leakage rate which can then be used for a period of time to infer production from the well. In other words, the pump is used as a meter.

Leakage Determination from a Well Test

Figure 12:
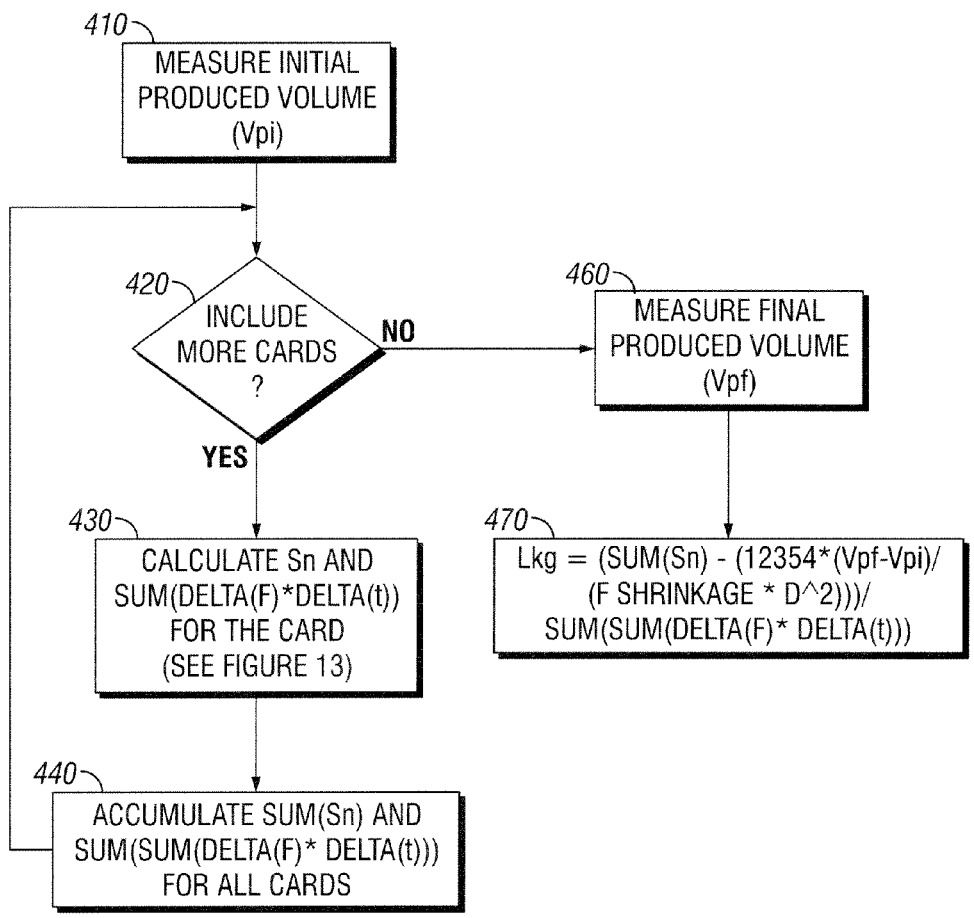
FIGS. 12, 13, and 14 are logic box flow diagrams which illustrate leakage determination from a well test.
Figure 13:
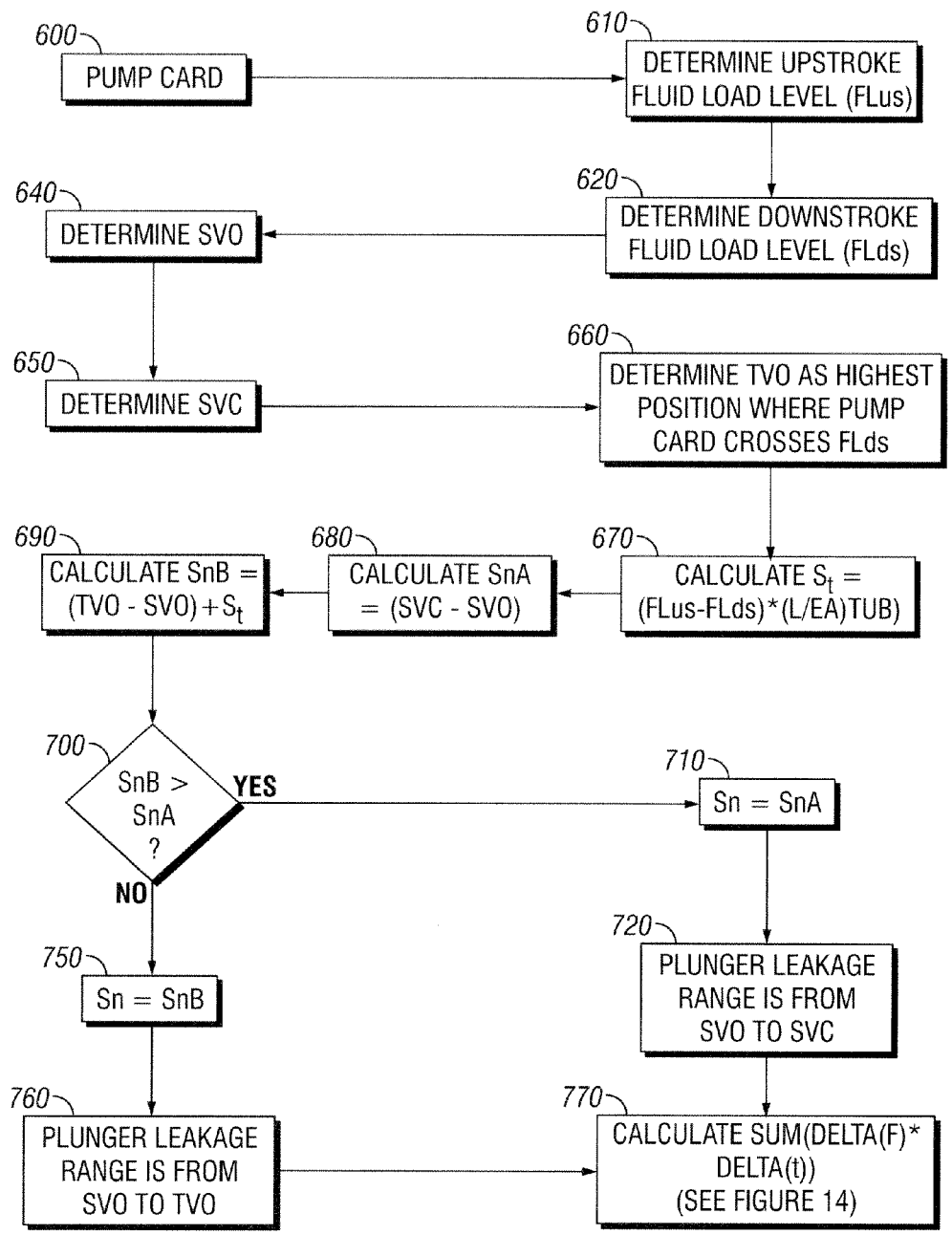
Figure 14:
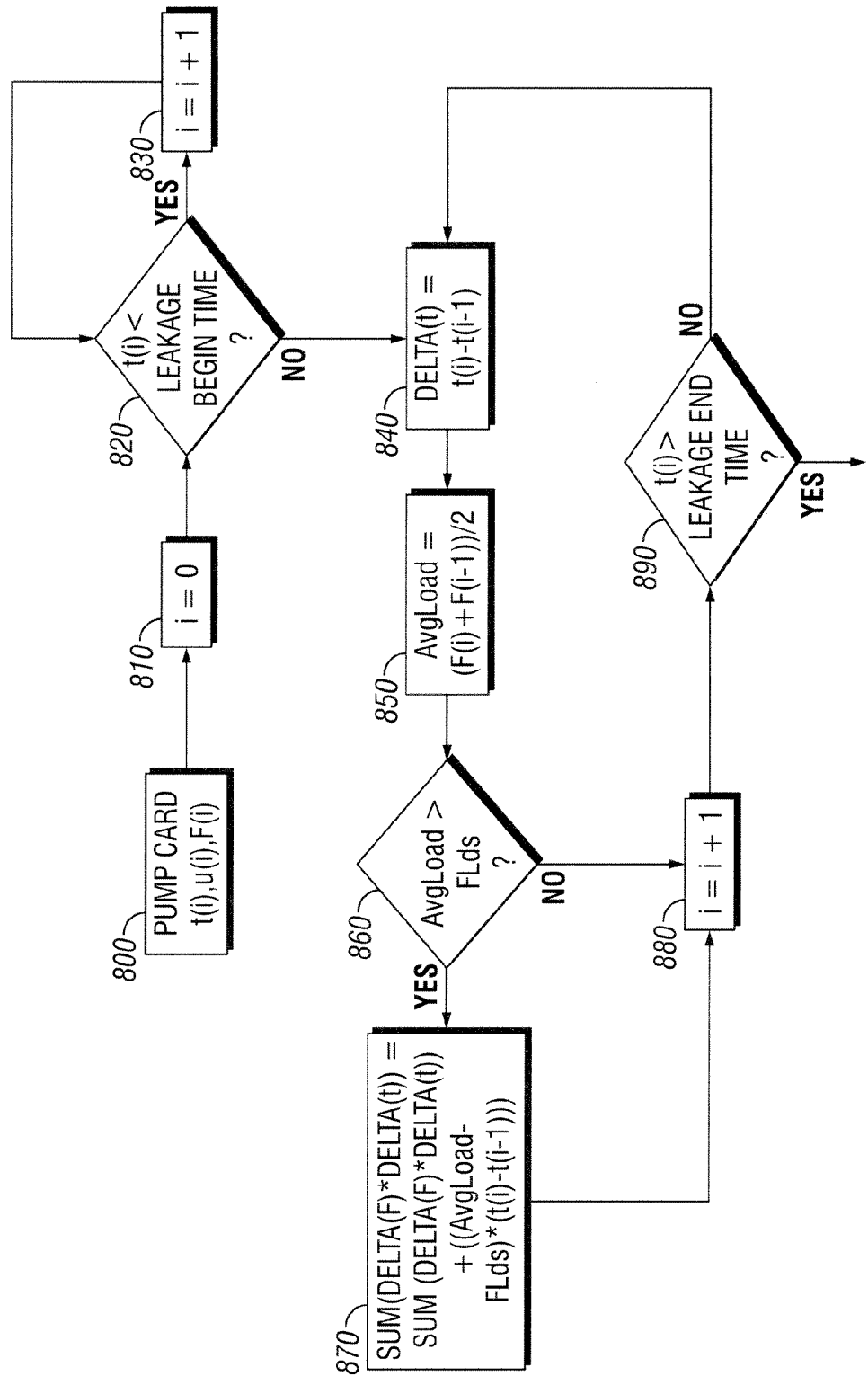

FIGS. 12, 13 and 14 illustrate, in logic box flow format, (and programmed in a well manager or controller) the method for performing a leakage calculation from a well test. FIG. 12 illustrates the leakage calculation; FIG. 13 illustrates a pump card analysis and FIG. 14 illustrates accumulating incremental pump card leakage.

As indicated by logic box 410, actual production of a well is measured from a well over a specified period of time. At the same time as the well production measurement of logic box 410, a downhole pump card 600 is computed for each stroke of the subsurface pump. Next, it is determined whether or not to include more cards, as indicated by logic box 420. For each stroke and if it is determined to include more cards, the parameters $S_n$ and Sum(Delta(F)DELTA(t))) are calculated according to logic box 430 and the "YES" branch of logic box 420. Next, according to logic box 440, the parameters Sum ($S_n$) and Sum(Sum(Delta (F)*Delta(t)))) for all strokes are accumulated. Next, it is determined whether or not to include more cards, as indicated by logic box 420.

If it is determined to not include more cards, the final production volume (Vpf) is measured, as is indicated by logic box 460 and the "NO" branch of logic box 420. Next, the plunger leak rate is determined as indicated by logic box 470 using the relationship, $$LKG = \frac{\sum (S_n) - 12354 * (Vpf - Vpi)/(F_{shrinkage} * D^2)}{\sum (\sum (\Delta(F) * \Delta(t)))}.$$

General Method of Applying Leakage Rate to a Single Card

First, as indicated by logic box 600, a pump card is computed. Next, the upstroke fluid level (FLus) is determined, as is indicated by logic box 610. Next, the downstroke fluid level (FLds) is determined, as is indicated by logic box 620. Next, the standing valve open position (SVO) is determined, as is indicated by logic box 640. Next the standing valve close position (SVC) is determined, as is indicated by logic box 650. Next, the traveling valve open position (TVO) is determined as the highest position where the pump card crosses the FLds, as is indicated by logic box 660. Next, $S_t$ is calculated as (FLus−FLds)*(L/EA)$_{tub}$, as is indicated by logic box 670. Next, SnA is calculated as (SVC−SVO), as is indicated by logic box 680. Next, SnB is calculated as (TVO−SVO)+$S_t$, as is indicated by logic box 690. Next, if SnB greater than SnA, then the "YES" branch of logic box 700 is followed to logic box 710, but if SnB is not greater than SnA, then the "NO" branch of logic box 700 should be followed to logic box 750, both as are indicated by logic box 700. If logic box 710 is followed, Sn is set equal to SnA. If logic box 750 is followed, Sn is set equal to SnB. Next, in either logic box 720 or logic box 760 depending if you proceeded through logic box 710 or logic box 750, the plunger leakage range is from SVO to SVC. Next, the parameter SUM(Delta(F)*Delta(t)) is calculated, as is indicated in logic box 770.

First, as indicated by logic box 800, a pump card is computed, which includes t(i), u(i), and F(i). Next, i is set equal to zero, as is indicated by logic box 810. Next, as indicated at logic box 820 and logic box 890, a LEAKAGE BEGIN TIME and a LEAKAGE END TIME are selected from the card for determining plunger leakage. Next, if t(i) is less than the LEAKAGE BEGIN TIME, then the "YES" branch of logic box 820 is followed to logic box 830, and if the t(i) is not less than the leakage begin time, then the "NO" branch of the logic box 820 is followed to logic box 840. If logic box 830 is followed, then i is set equal to i+1 and logic box 820 is returned to, as indicated by logic box 830. If logic box 840 is followed, then DELTA(t)=(i)−t(i−1), as indicated by logic box 840. Next, AvgLoad=(F(i)+F(i−1))/2, as indicated by logic box 850. Next, if AvgLoad is greater than FLds, then the "YES" branch of logic box 860 is followed to logic box 870, and if AvgLoad is not greater than FLds, then the "NO" branch of logic box 860 is followed to logic box 880. If logic box 870 is followed, then SUM(DELTA(F)*DELTA(t)) is equal to SUM(DELTA(F)*DELTA(t))+((AvgLoad−FLds)*t(i)−t(i−1)) and then proceed to logic box 880. As is indicated by logic box 880, i is equal to i+1. Next, if t(i) is greater than LEAGAGE END TIME, then the "YES" branch of the logic box 890 is followed and the accumulating pump card leakage calculation is complete, and if t(i) is not greater than LEAGAGE END TIME, then the "NO" branch of the logic box 890 is followed to logic box 840 for the calculation to continue.

Figure 15:
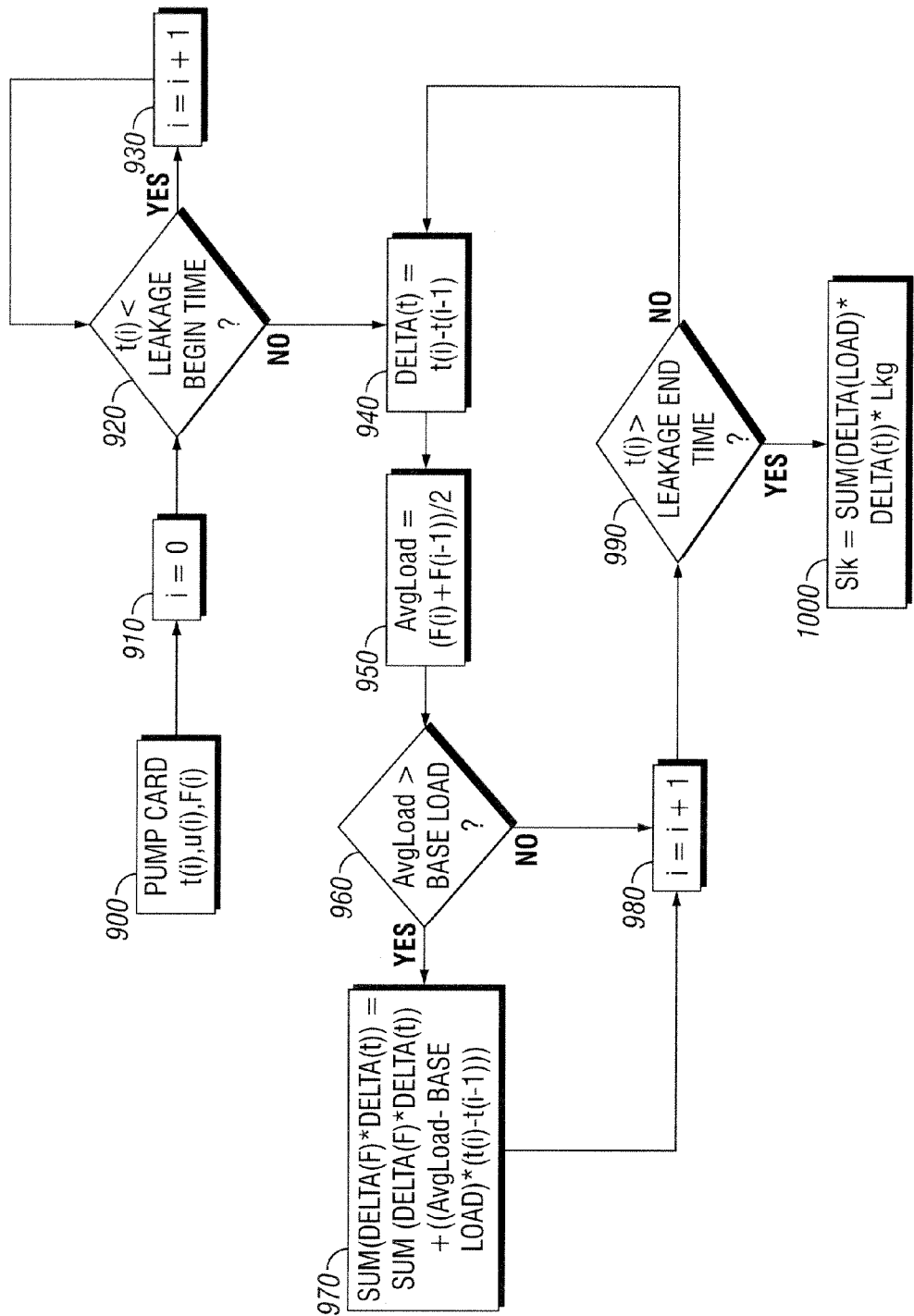
FIG. 15 is a logic box flow diagram which illustrates determination of leakage for a specific stroke of the pump.

FIG. 15 illustrates a generalized method of applying leakage rate to a single pump card. As indicated at logic box 900, a pump card is computed. Next, i is set equal to zero, as is indicated by logic box 910. Next, as indicated at logic box 920 and logic box 990, a beginning time and an end time are selected from the card for determining plunger leakage. Next, if t(i) is less than the LEAKAGE BEGIN TIME, then the "YES" branch of logic box 920 is followed to logic box 930, and if the t(i) is not less than the leakage begin time, then the "NO" branch of the logic box 920 is followed to logic box 940. If logic box 930 is followed, then is set equal to i+1 and logic box 920 is returned to, as indicated by logic box 930. If logic box 940 is followed, then DELTA(t)=(i)−t(i−1), as indicated by logic box 940. Next, AvgLoad=(F(i)+F(i−1))/2, as indicated by logic box 950.

Next, a reference base line is selected as indicated by logic box 960. Next, as indicated by logic box 970 for each point in the pump card between the beginning and ending time, A (F) is calculated using the logic, if(load($i$)+load($i$−1))>2*baseline load) then Delta($F$)=((load($i$)+load($i$−1))/2)−baseline load, otherwise, $\Delta(F)$=0, The parameter $\Sigma(\Delta(F)*\Delta(t))$ is accumulated for all the points in the time range as indicated by logic box 970. As is indicated by logic box 980, i is equal to i+1.

The plunger leakage volume is determined, as indicated by logic box 1000, according to the equation, $S_{lkg} = \Sigma(\Delta(F))*(\Delta(t))*LKG$.

Inferring Production from a Pump Card

Another aspect of the invention includes a method of estimating the net liquid production from a pump card.

The preferred method of estimating production from a pump card relies on the locations of the opening and closing positions of standing and traveling valves. One method of locating these "corners" of the card begins with determination of the fluid load levels $FL_{us}$ and $FL_{ds}$. See FIG. 1. Once the fluid load levels have been selected, the traveling valve close position (TVC) can be determined as the lowest position value where the pump card load intersects $FL_{ds}$. The traveling valve open position (TVO) is the highest plunger position where the pump card load intersects $FL_{ds}$.

Similarly, the standing valve open position (SVO) is the lowest plunger position where the pump card load intersects $FL_{us}$, and the standing valve close position (SVC) is the highest position where the pump card load intersects $FL_{us}$.

Figure 6A:
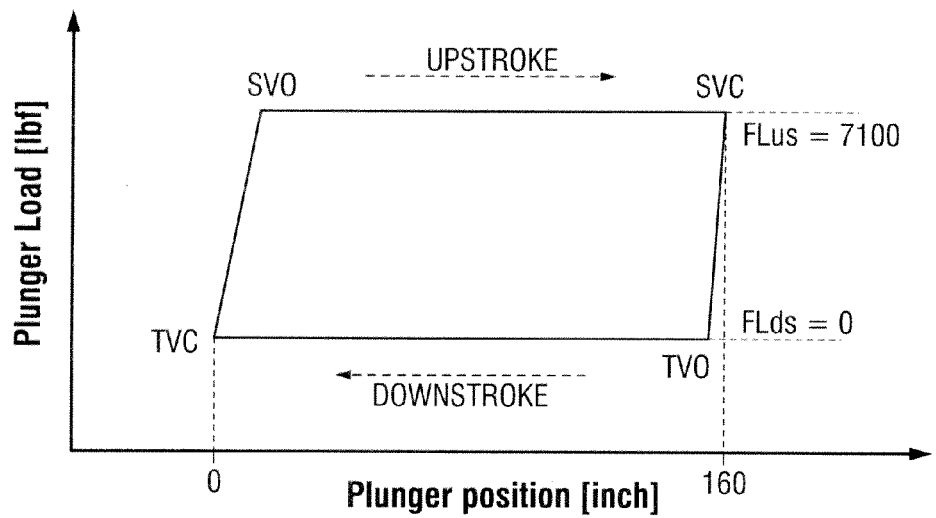
FIGS. 6A and 6B illustrate a full pump card and plunger position and plunger loads during a pump cycle.

FIG. 6A is an example of an ideal pump card with both significant tubing stretch and significant plunger leakage. Those two phenomena combine to cause the left side of the pump card to be sloped, rather than being vertical. For simplicity, the critical "corners" of the pump card are connected by straight lines so attention can be focused on the relationships between these points.

Figure 6B:
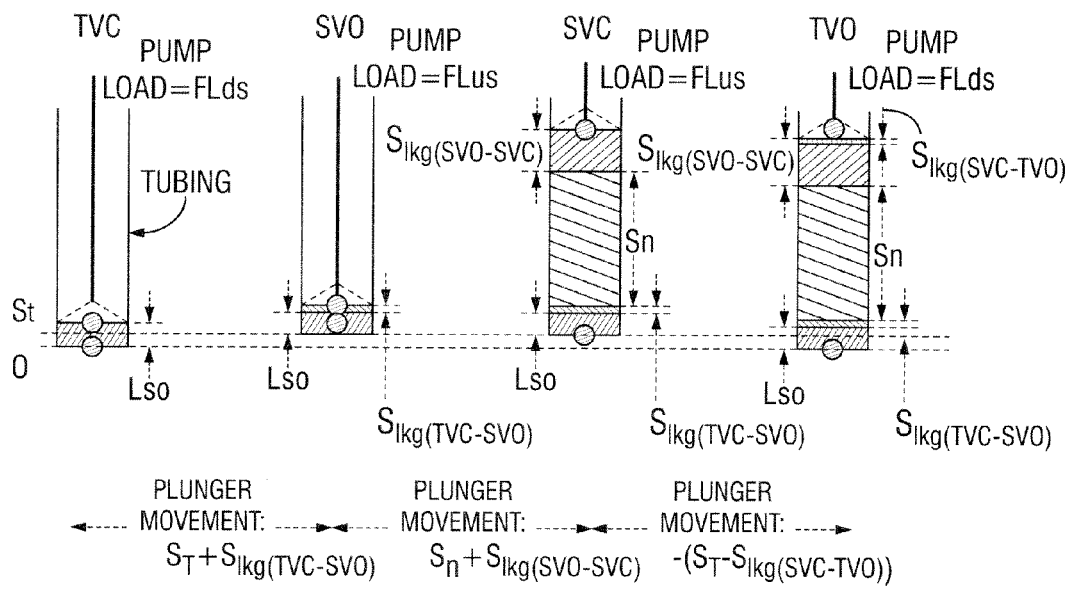

Selecting TVC as a starting point for an analysis of the card, FIG. 6B depicts the contributions of both tubing movement ($S_t$) and leakage ($S_{LKG(TVC-SVO)}$) to the offset in plunger position between TVC and SVO. Other factors can contribute to this offset. Such factors include, compressibility of the fluid trapped in the void space between the traveling and standing valves ($L_{so}$), and delayed traveling valve seating due to pump inclination and/or "sticky" ball catcher.

As the plunger continues upward between SVO and SVC, the pressure difference across the plunger is the greatest. During this time, the leakage rate is also at its maximum. When the plunger reaches its maximum position and SVC occurs, the fluid in the barrel is made up of a combination of, fluid which was pulled through the standing valve ($S_n$)— "production,"

fluid which leaked around/through the plunger between SVO and SVC ($S_{LKG(SVO-SVC)}$), and fluid which was already in the barrel at SVO as a result of leakage ($S_{LKG(TVC-SVO)}$).

As the downstroke begins, the tubing stretches due to increased load on the standing valve. Before TVO can occur, the plunger must move down to compensate for this tubing movement. However, the plunger leakage continues, because there is still a pressure difference across the plunger. This leakage tries to fill the void between the traveling valve and standing valve, resulting in accelerated TVO. Therefore, the plunger does not have to move the full distance ($S_t$) to cause TVO.

Using the standing valve as the reference point for inferred production, FIGS. 6A and 6B suggest a way to determine inferred production ($S_n$) from this "ideal" card using equation 17, $$S_n = SVC - SVO - S_{LKG(SVO-SVC)} \qquad (17)$$

Equation 17 is advantageous because it provides a way of inferring production without the need to model tubing movement or other factors which delay SVO.

Although FIG. 6A is instructive, it fails to depict a phenomenon which occurs in virtually every pump card, to some extent. FIG. 8A illustrates the phenomenon of premature SVC. At the top of the upstroke, the velocity of the plunger must decelerate to zero. At some point during this deceleration, the upward velocity of the plunger fails to "outrun" the plunger leakage. The extent to which this phenomenon occurs on each particular well varies greatly. In wells equipped with "high clearance" pumps, the premature SVC can render the top 10 inches or more of the stroke to be useless.

Analyzing the case depicted by FIG. 8A, equation 17 still applies. As long as the standing valve opening and closing positions can be properly identified and leakage (between SVO and SVC) can be approximated, equation 17 still applies.

FIG. 9A illustrates another complicating factor in the effort to infer production from commonly encountered pump cards. This FIG. 9A depicts a pump card with incomplete barrel fillage. When the pump barrel is not completely filled with liquid during the upstroke, the transfer of load from the rods to the tubing on the downstroke is delayed. As FIG. 9B depicts, there is a portion of the barrel filled with low pressure gas at SVC. In order for the traveling valve to open, a combination of plunger leakage and plunger downstroke is required to compress this gas column to pump discharge pressure. As FIG. 9B depicts, the volume occupied by this gas changes dramatically from $S_{gas(SVC)}$ to $S_{gas(TVO)}$. Additionally, experts in the field of rod pumping believe that some of the gas mass which exists as free gas during SVC is transferred into the liquid (goes into solution) as pump barrel pressure increases.

The complex phase behavior of petroleum fluids and the fact that pump barrel pressure is not known with any certainty at either SVC or TVO result in a situation whereby neither $S_{gas(SVC)}$ nor $S_{gas(TVO)}$ can be estimated with any degree of certainty. Yet the high pressure ratios typically encountered with this type of pump card, and the belief that much of the free gas goes into solution, suggest that it is within acceptable error to assumes that $S_{gas(TVO)}$ is close to zero.

Using this previous assumption ($S_{gas(TVO)}=0$), it can be determined that the pump card from FIG. 8A obeys the relationship defined by equation 18, $$S_n = TVO - SVO - S_{LKC(SVO-TOV)} + S_t \qquad (18)$$

where $S_t$ provides an estimate of the tubing axial stretch occurring when the fluid load is transferred from the traveling valve to the standing valve. The $S_t$ term is necessary in equation 18 because the traveling valve holds the fluid load at SVO, but the standing valve holds the fluid load at TVO.

In order for a well site computer to infer production on a stroke-by-stroke basis, a logical algorithm is provided which differentiates between situations in which equation 18 applies and equation 17 applies. By examination, it can be seen that equation 17 applies whenever SVC exceeds TVO and equation 18 applies otherwise.

Equation 17 calculates volume (expressed in inches of plunger stroke) based on pump intake pressure and temperature conditions. Equation 18 expresses volume on the basis of pump discharge pressure and temperature. Appropriate shrinkage factors ($F_{shrinkage}$) must be applied to the estimates of $S_n$ to correct these volumes for stock tank conditions. Under most conditions, the difference between the shrinkage factors (pump intake pressure vs. pump discharge pressure) will be negligible. However, in some conditions it may be necessary to apply a weighted average $F_{shrinkage}$.

Figure 16:
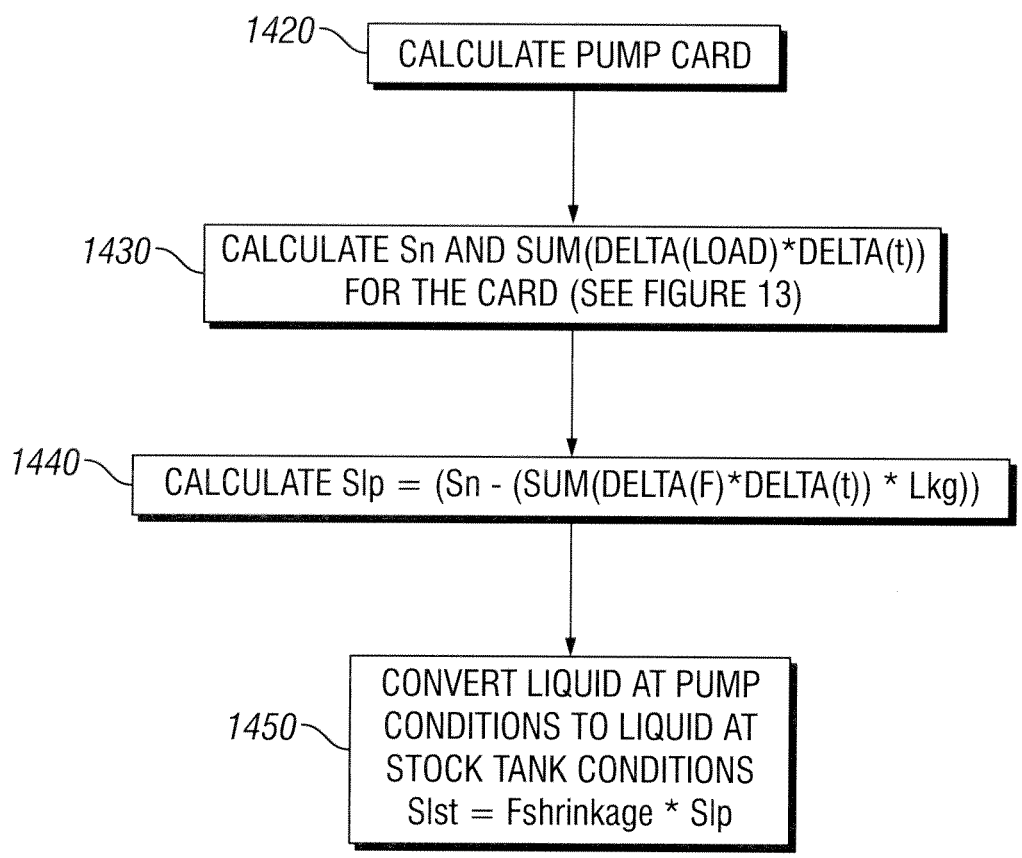
FIG. 16 is a logic box flow diagram which illustrates determination of inferred production for a specific stroke of the pump.

General Method for Calculating Liquid Production for a Single Stroke of the Pump FIG. 16 illustrates a method for determining the liquid production for a single stroke of a pumping unit. First, a pump card is calculated as indicated by logic box 1420. Next, as indicated by logic box 1430, net stroke $S_n$ and $\Sigma(\Delta(F)*\Delta(t))$ are determined. Next, the net liquid produced $S_{lp}$ at pump condition is computed as indicated by logic box 1440. Next, as indicated by logic box 1450, the net liquid produced $S_{lst}$ at stock tank condition is computed.

The inferred daily liquid production rate in stock tank barrels per day is computed from the equation, $$Q_d = \frac{6.994 \sum S_{lst}}{T_p + T_d},$$

where, $Q_d$ is the inferred production rate (stock tank BPD),
$T_P$ is the cumulative producing time during the day (seconds), and
$T_d$ is the cumulative down time during the day (seconds).

List of Parameters Used in the Description Above $A_i$—cross-sectional area of the $i^{th}$ taper in the rod string [inch$^2$]
$A_t$—cross-sectional area of the tubing [inch$^2$]
dF/dt—polished rod load [lbf] loss rate [lbf/sec] calculated by numerically differentiating the polished rod load vs time data collected during the valve check.
$E_i$—Young's Modulus of the $i^{th}$ taper in the rod string [lbf/inch$^2$]
$E_t$—Young's Modulus of the tubing [lbf/inch$^2$]
F(i)—load at the $i^{th}$ index in the pump card array [lbf]
$FL_{ds}$—pump card load level of the lower fluid load line—representing fluid load during the downstroke [lbf]
$FL_{us}$—pump card load level of the upper fluid load line—representing fluid load during the upstroke [lbf]
$F_{shrinkage}$—Shrinkage factor. Ratio of surface volume to pump volume for a given mass of material [stock tank BBL/pump BBL]
$L/(EA)_{rods}$—stress/strain conversion factor for the rod string [in/lbf]
$L/(EA)_{tot}$—total stress/strain conversion factor. Equals the sum of rod string stress/strain ratio and (unanchored) tubing stress/strain ratio [in/lbf]
$L/(EA)_{tub}$—stress/strain conversion factor for the (unanchored) tubing [in/lbf]
$L_i$—length of the $i^{th}$ taper in the rod string [inches]
LKG—plunger leakage rate [in/lbf-sec]
$L_{tu}$—length of the unanchored tubing (pump depth minus anchor depth) [inches]
$L_{so}$—offset between standing and traveling valves (expressed in inches of pump stoke when plunger is at bottom of stroke. This distance is controlled by pump design and "space-out". The distance is not relevant to inferred production except that large $L_{so}$ can result in higher compressibility on the downstroke [inches]
$M_{is}$—slope of the line derived from applying least squares method to the traveling valve check data using dF/dt as the dependent variable and force (polished rod load) as the independent variable [1/sec]
$S_{gas(SVC)}$—portion of the barrel filled with (low pressure) free gas at the time when the standing valve closes [inches of plunger stroke]
$S_{gas(TVO)}$—portion of the barrel filled with (high pressure) free gas at the time when the traveling valve opens [inches of plunger stroke]
$S_{in}$—net liquid stroke from the pump card [inches of plunger stroke]
$S_{leakage(TVC-SVO)}$—volume expressed in equivalent inches of plunger movement of the plunger/traveling valve leakage that occurs between traveling valve open and standing valve close [inches of plunger stroke]
$S_{LKG}$—plunger leakage volume expressed in equivalent inches of plunger movement [inches of plunger stroke]
$S_{lp}$—net liquid produced (at pump conditions) for a single stroke of the pumping unit [inches of plunger stroke]
$S_{lst}$—net liquid produced (at stock tank conditions) for a single stroke of the pumping unit [inches of plunger stroke]
$S_n$—net stroke from the pump card [inches of plunger stroke]
$S_t$—length of tubing stretch as a result of fluid load applied to standing valve [inch of plunger stroke]
SVC—the position in the plunger stroke where the standing valve closes [inch]
SVO—the position in the plunger stroke where the standing valve opens [inch]
t(i)—time at the $i^{th}$ index in the pump card array [sec]
TVC—the position in the plunger stroke where the traveling valve closes [inch]
TVO—the position in the pump stroke where the traveling valve opens [inch]
u(i)—plunger position at the $i^{th}$ index in the pump card array [inch]
$V_{pi}$—produced liquid volume at beginning of test [BBL]
$V_{pf}$—produced liquid volume at end of test [BBL]

What is claimed is:

1. A method of determining traveling valve/plunger leakage rate LKG in a subsurface pump reciprocated by a rod string comprising the steps of:
  stopping the rod string at the surface during an upstroke,
  determining the surface axial load on the rod string for a plurality of times until axial load has stabilized, determining dF/dt from polished rod load vs time data,
selecting a subset of the dF/dt vs axial load data for analysis,
applying linear regression using dF/dt as the dependent variable and axial load as the independent variable to derive a best fit line to the selected data,
calculating total stress/strain ratio for the rods and tubing, and
using the slope of the linear regression line and total stress/strain ratio to determine the plunger leakage rate LKG.

2. The method of claim 1 further including steps for determining in a well manager computer the net liquid production for a single stroke of said subsurface pump comprising the steps of
computing a pump card
determining $S_n$ and $\Sigma(\Delta(F)*\Delta(t))$ from the pump card, where Sn is the net stroke in inches of plunger stroke and $\Delta(F)$ is the change in axial load of the plunger,
determining the net liquid produced $S_{lp}$ at pump conditions for a single stroke of the pumping unit from the relationship, $$S_{lp} = S_n - (LKG*(\Sigma(\Delta(F)*\Delta(t)))).$$

3. The method of claim 2 further including the step of determining in a well manager computer the net liquid produced $S_{lst}$ at stock tank conditions for a single stroke of the pumping unit from the relationship $$S_{lst} = F_{shrinkage}*S_{lp}$$

where $F_{shrinkage}$ is a shrinkage further representing the ratio of surface volume to pump volume for a given mass of material.

4. The method of claim 3 further comprising the step of computing in a well manager computer inferred daily production rate in stock tank barrels per day from the relationship, $$Q_d = (6.994*\Sigma S_{lst})/(T_p+T_d)$$

where:
$Q_d$ is the inferred production rate [stock tank BPD]
$T_p$ is the cumulative producing time during the day [seconds]
$T_d$ is the cumulative down time during the day [seconds].

5. A method of determining traveling valve/plunger leakage rate in a subsurface pump comprising the steps of:
selecting a number of tests to perform,
for each selected test,
stopping the rod string at the surface during the upstroke,
determining the surface axial load on the rod string for a plurality of times until axial load has stabilized,
determining dF/dt from polished rod load vs time data, and
selecting a subset of the dF/dt vs axial load data for analysis,
applying linear regression using dF/dt as the dependent variable and axial load as the independent variable to derive a best fit line to the selected data,
calculating total stress/strain ratio for the rods and tubing, and
determining the plunger leakage rate LKG as a function of the slope of the linear regression line and the total stress/strain ratio.

6. The method of claim 5 further including steps for determining in a well manager computer the net liquid production for a single stroke of said subsurface pump comprising the steps of
computing a pump card
determining $S_n$ and $\Sigma(\Delta(F)*\Delta(t))$ from the pump card, where Sn is the net stroke in inches of plunger stroke and $\Delta(F)$ is the change in axial load of the plunger,
determining the net liquid produced $S_{lp}$ at pump conditions for a single stroke of the pumping unit from the relationship, $$S_{lp} = S_n - (LKG*(\Sigma(\Delta(F)*\Delta(t)))).$$

7. The method of claim 6 further including the step of determining in a well manager computer the net liquid produced $S_{lst}$ at stock tank conditions for a single stroke of the pumping unit from the relationship $$S_{lst} = F_{shrinkage}*S_{lp}$$

where $F_{shrinkage}$ is a shrinkage further representing the ratio of surface volume to pump volume for a given mass of material.

8. The method of claim 7 further comprising the step of computing in a well manager computer inferred daily production rate in stock tank barrels per day from the relationship, $$Q_d = (6.994*\Sigma S_{lst})/(T_p+T_d)$$

where:
$Q_d$ is the inferred production rate [stock tank BPD]
$T_p$ is the cumulative producing time during the day [seconds]
$T_d$ is the cumulative down time during the day [seconds].

9. A method for determining traveling valve/plunger leakage rate LKG in a subsurface pump comprising of the steps:
measuring actual production from a well over a specific period of time to produce a well production measurement,
coincident with the well production measurement, computing a downhole pump card [600] for each stroke of the subsurface pump,
for each stroke, calculating $S_n$ and Sum(Delta(F)*Delta(t)),
accumulating Sum($S_n$) and Sum(Sum(Delta(F)*Delta(t))) for all strokes, and
determining plunger leakage rate using the relationship, $$LKG = (\Sigma S_n - (12354*((V_{pf}-V_{pi})/(F_{shrinkage}*D^2))))/\Sigma(\Sigma(\Delta(F)*\Delta(t))).$$

10. The method of claim 9 further including steps for determining in a well manager computer the net liquid production for a single stroke of said subsurface pump comprising the steps of
computing a pump card
determining $S_n$ and $\Sigma(\Delta(F)*\Delta(t))$ from the pump card, where Sn is the net stroke in inches of plunger stroke and $\Delta(F)$ is the change in axial load of the plunger,
determining the net liquid produced $S_{lp}$ at pump conditions for a single stroke of the pumping unit from the relationship, $$S_{lp} = S_n - (LKG*(\Sigma(\Delta(F)*\Delta(t)))).$$

11. The method of claim 10 further including the step of determining in a well manager computer the net liquid produced $S_{lst}$ at stock tank conditions for a single stroke of the pumping unit from the relationship $$S_{lst} = F_{shrinkage}*S_{lp}$$

where $F_{shrinkage}$ is a shrinkage further representing the ratio of surface volume to pump volume for a given mass of material.

12. The method of claim 7 further comprising the step of computing in a well manager computer inferred daily production rate in stock tank barrels per day from the relationship, $$Q_d = (6.994*\Sigma S_{lst})/(T_p+T_d)$$

where:
- $Q_d$ is the inferred production rate [stock tank BPD]
- $T_p$ is the cumulative producing time during the day [seconds]
- $T_d$ is the cumulative down time during the day [seconds].

13. The method of claim 1, 5, or 9 further comprising steps to determine valve/plunger leakage volume ($S_{LKG}$) in a subsurface pump, comprising the steps of, computing a pump card,
  selecting a beginning time and end time from the card for determining plunger leakage,
  selecting a reference baseline load,
  for each point in the pump card between the selected beginning and ending times, calculating $\Delta(F)$ using the logic, if (load($i$)+load($i$−1))>2*baseline load) then $\Delta(F)=((\text{load}(i)+(i-1))/2)-\text{baseline load}$, otherwise, $\Delta(F)=0$, accumulating $\Sigma\Delta(F)*\Delta(t)$ for all points in the time range, and
  determining plunger leakage volume according to the equation, $S_{LKG}=(\Sigma(\Delta(F)*\Delta(t)))*LKG$.

14. The method of claim 13 further including steps for determining in a well manager computer the net liquid production for a single stroke of said subsurface pump comprising computing a pump card,
  determining $S_n$ from the pump card
  where Sn is the net stroke in inches of plunger stroke
  determining the net liquid produced $S_{lp}$ at pump conditions for a single stroke of the pumping unit from the relationship $S_{lp}=S_n-S_{LKG}$.

15. The method of claim 14 further including the step of determining in a well manager computer the net liquid produced $S_{lst}$ at stock tank conditions for a single stroke of the pumping unit from the relationship $S_{lst}=F_{shrinkage}*S_{ip}$ where $F_{shrinkage}$ is a shrinkage further representing the ratio of surface volume to pump volume for a given mass of material.

16. The method of claim 15 further comprising the step of computing in a well manager computer inferred daily production rate in stock tank barrels per day from the relationship, $Q_d=(6.994*\Sigma S_{lst})/(T_p+T_d)$ where:
- $Q_d$ is the inferred production rate [stock tank BPD]
- $T_p$ is the cumulative producing time during the day [seconds]
- $T_d$ is the cumulative down time during the day [seconds].

* * * * *